US012305532B2

(12) United States Patent
Mizukami et al.

(10) Patent No.: US 12,305,532 B2
(45) Date of Patent: May 20, 2025

(54) COOLING METHOD AND STRUCTURE OF VANE OF GAS TURBINE

(71) Applicant: MITSUBISHI HEAVY INDUSTRIES, LTD., Tokyo (JP)

(72) Inventors: Satoshi Mizukami, Houston, TX (US); David Allen Flodman, Houston, TX (US); Satoshi Hada, Houston, TX (US)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/988,336

(22) Filed: Nov. 16, 2022

(65) Prior Publication Data

US 2024/0159152 A1 May 16, 2024

(51) Int. Cl.
*F01D 5/18* (2006.01)
*F01D 9/04* (2006.01)

(52) U.S. Cl.
CPC ............. *F01D 5/187* (2013.01); *F01D 9/041* (2013.01); *F05D 2240/81* (2013.01);
(Continued)

(58) Field of Classification Search
CPC .......... F01D 5/186; F01D 5/187; F01D 5/188; F01D 5/189; F01D 9/041; F05D 2240/81;
(Continued)

(56) References Cited

U.S. PATENT DOCUMENTS 5,813,835 A * 9/1998 Corsmeier .............. F01D 5/187 415/115
5,954,475 A * 9/1999 Matsuura ................ F01D 5/182 415/114
(Continued)

FOREIGN PATENT DOCUMENTS

EP 3252272 A1 12/2017
JP 08-270401 A 10/1996
(Continued)

OTHER PUBLICATIONS

International Search Report dated Nov. 21, 2023, issued in counterpart International Application No. PCT/JP2023/037085, with English translation. (10 pages).
(Continued)

*Primary Examiner* — Courtney D Heinle
*Assistant Examiner* — Michael K. Reitz
(74) *Attorney, Agent, or Firm* — WHDA, LLP

(57) ABSTRACT

A shroud of a vane of a turbine is provided. The shroud comprises a shroud main body; and a shroud edge disposed on a circumference of the shroud main body to surround the shroud main body, the shroud edge comprising a shroud edge passage therein, the shroud edge passage is disposed along the circumference of the shroud main body. The shroud edge comprises a plurality of cooling air inlets configured to introduce a cooling air into the shroud edge passage from outside of the shroud edge, and a plurality of cooling air outlets configured to cause the cooling air to flow out of the shroud edge passage to the outside of the shroud edge. The shroud edge passage is divided into three or more sub-passages by the plurality of cooling air inlets and the plurality of cooling air outlets.

12 Claims, 15 Drawing Sheets

(52) U.S. Cl.
CPC .. *F05D 2250/291* (2013.01); *F05D 2260/201* (2013.01); *F05D 2260/232* (2013.01)

(58) Field of Classification Search
CPC ......... F05D 2260/201; F05D 2260/202; F05D 2260/204; F05D 2260/232
See application file for complete search history.

(56) References Cited

U.S. PATENT DOCUMENTS

| | | | | |
|---|---|---|---|---|
| 6,196,799 | B1 | 3/2001 | Fukue et al. | |
| 6,264,426 | B1 * | 7/2001 | Fukuno | F01D 5/187 415/115 |
| 8,011,881 | B1 * | 9/2011 | Liang | F01D 5/187 415/115 |
| 9,638,045 | B2 * | 5/2017 | Weber | F01D 5/189 |
| 11,536,149 | B1 | 12/2022 | Mizukami et al. | |
| 2004/0018082 | A1 | 1/2004 | Soechting et al. | |
| 2009/0232660 | A1 * | 9/2009 | Liang | F01D 5/187 416/97 R |
| 2010/0239432 | A1 * | 9/2010 | Liang | F01D 11/001 416/97 R |
| 2012/0177479 | A1 | 7/2012 | Azad et al. | |
| 2014/0072400 | A1 * | 3/2014 | Dillard | F01D 5/187 239/127.1 |
| 2018/0045060 | A1 | 2/2018 | Matsuo et al. | |
| 2018/0347369 | A1 * | 12/2018 | Sakaguchi | F01D 5/187 |
| 2019/0032499 | A1 | 1/2019 | Matsuo et al. | |
| 2020/0208525 | A1 * | 7/2020 | Atsumi | B33Y 80/00 |
| 2020/0300104 | A1 | 9/2020 | Fukui | |
| 2023/0287796 | A1 | 9/2023 | Mizukami et al. | |

FOREIGN PATENT DOCUMENTS

| | | | |
|---|---|---|---|
| JP | 11-236805 | A | 8/1999 |
| JP | 2004-060638 | A | 2/2004 |
| JP | 6418667 | B2 | 11/2018 |
| JP | 2019-078204 | A | 5/2019 |
| JP | 2020-020344 | A | 2/2020 |
| WO | 2016/152573 | A1 | 9/2016 |
| WO | 2023/171745 | A1 | 9/2023 |
| WO | 2023/171752 | A1 | 9/2023 |

OTHER PUBLICATIONS

Written Opinion dated Nov. 21, 2023, issued in counterpart International Application No. PCT/JP2023/037085, with English translation. (12 pages).

* cited by examiner

COOLING METHOD AND STRUCTURE OF VANE OF GAS TURBINE

TECHNICAL FIELD

The present disclosure relates to a cooling method of a stator vane of a gas turbine, and also relates to a cooling structure of a stator vane of a gas turbine.

BACKGROUND

A stator vane of a gas turbine and a rotor blade of the gas turbine are exposed to high temperature combustion gas. Thus, the stator vane and the rotor blade are cooled by cooling air. For example, Japanese Patent No. 6418667 (JP '667) describes cooling of a turbine static blade. FIG. 4 of JP '667 describes that cooling air is taken in at two air intakes of a pressure-side passage and a suction-side passage respectively located a position closer to a leading-edge of a shroud. Then, the cooling air flows along the pressure-side passage and the suction-side passage toward a trailing edge of the shroud, respectively, and then, is exhausted to a hot-gas passage from two outlets respectively located at the trailing edge of the shroud.

SUMMARY

Recently, gas turbine inlet temperature is increased, and thus, it is desirable to further facilitate cooling of the first stage stator vane. One of approaches to address the above is to supply cooling air with higher pressure and lower temperature (compared to conventional technology) to the first stage stator vane. According to the study by inventors, in a case when the cooling air with higher pressure and lower temperature is used for cooling the first stage stator vane, even after the cooling air is used for cooling an airfoil or a shroud edge, there is a possibility that the cooling air may be re-used for cooling other elements or components of the first stage stator vane. However, in the conventional technology, efficiency of use of the cooling air is limited.

It is desirable to provide a cooling method or cooling structure of a stator vane of a gas turbine which enables better efficiency of use of cooling air.

According to a first aspect of the present disclosure, there is provided a shroud of a vane of a turbine, the shroud comprising:

- a shroud main body; and
- a shroud edge disposed on a circumference of the shroud main body to surround the shroud main body, the shroud edge comprising a shroud edge passage therein, the shroud edge passage is disposed along the circumference of the shroud main body.

The shroud edge comprises a plurality of cooling air inlets configured to introduce a cooling air into the shroud edge passage from outside of the shroud edge, and a plurality of cooling air outlets configured to cause the cooling air to flow out of the shroud edge passage to the outside of the shroud edge.

The shroud edge passage is divided into three or more sub-passages by the plurality of cooling air inlets and the plurality of cooling air outlets.

With the above-described feature, it is possible to increase the number of shroud edge passage by using three or more sub-passages of the shroud, which enables to reduce amount of air flow of cooling air for each sub-passage. Thus, it becomes possible to decrease cross sectional area of the shroud edge passage which provides more space for enlargement of the should main body which facilitates arrangement of necessary parts in the enlarged space of the shroud main body. Moreover, with the above-described feature, it becomes possible to have shorter sub-passage which decreases pressure loss of the cooling air inside the shroud edge passage.

According to a second aspect of the present disclosure, there is provided a method of cooling a vane of a turbine comprising a shroud, the shroud comprising:

- a shroud main body; and
- a shroud edge disposed on a circumference of the shroud main body to surround the shroud main body, the shroud edge comprising a shroud edge passage therein, the shroud edge passage is disposed along the circumference of the shroud main body,
- wherein the shroud edge comprises:
- a leading-side shroud edge positioned at an upstream end portion of the shroud edge with respect to a flow of hot gas in the turbine,
- a trailing-side shroud edge positioned at a downstream end portion of the shroud edge with respect to the flow of hot gas in the turbine,
- a suction-side shroud edge positioned on a suction side of the shroud edge with respect to the flow of hot gas in the turbine, and
- a pressure-side shroud edge positioned on a pressure side of the shroud edge with respect to the flow of hot gas in the turbine,
- wherein the suction-side shroud edge comprises a suction-side shroud edge passage therein, and the pressure-side shroud edge comprises a pressure-side shroud edge passage therein,
- wherein the method comprising steps of:
- causing a cooling air to flow inside of the suction-side shroud edge passage from an upstream side toward a downstream side with respect to the flow of hot gas in the turbine;
- causing the cooling air to flow inside of the suction-side shroud edge passage from the downstream side toward the upstream side with respect to the flow of hot gas in the turbine; and
- causing the cooling air to flow out of the suction-side shroud edge passage from a cooling air outlet disposed at an intermediate position of the suction-side shroud edge passage.

With the above-described feature, it is possible to increase the number of shroud edge passages in the suction-side shroud edge passage, which enables to reduce amount of air flow of cooling air for each sub-passage. Thus, it becomes possible to decrease cross sectional area of the shroud edge passage which provides more space for enlargement of the should main body which facilitates arrangement of necessary parts in the enlarged space of the shroud main body. Moreover, with the above-described feature, it becomes possible to have shorter sub-passage in the suction-side shroud edge passage which decreases pressure loss of the cooling air inside the shroud edge passage.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
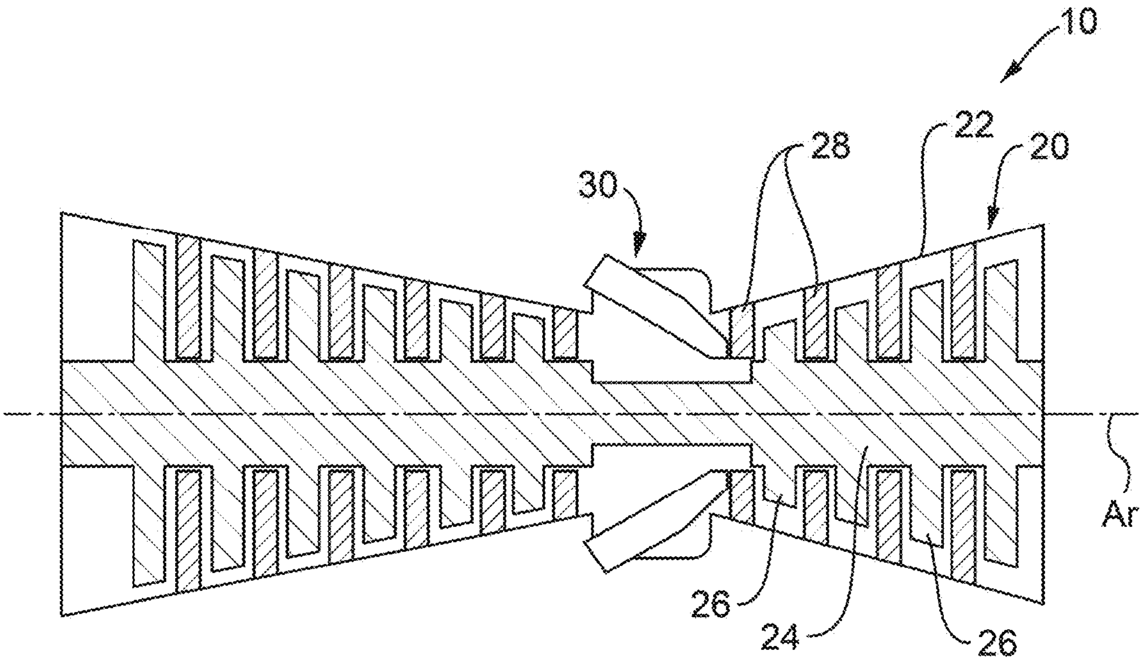
FIG. 1 is a schematic sectional view of a gas turbine in an embodiment according to the present disclosure.

A preferred embodiment of the present disclosure will be described in detail below with reference to the drawings. FIG. 1 is a schematic sectional view of a gas turbine in an embodiment according to the present disclosure. As shown in FIG. 1, a gas turbine 10 of this embodiment includes a turbine 20 driven by combustion gas generated by a combustor 30. The turbine 20 has a rotor shaft 24, a turbine rotor 26 that rotates around an axis Ar, a turbine casing 22 that covers the turbine rotor 26, and a plurality of stator vane stages 28.

Figure 2:
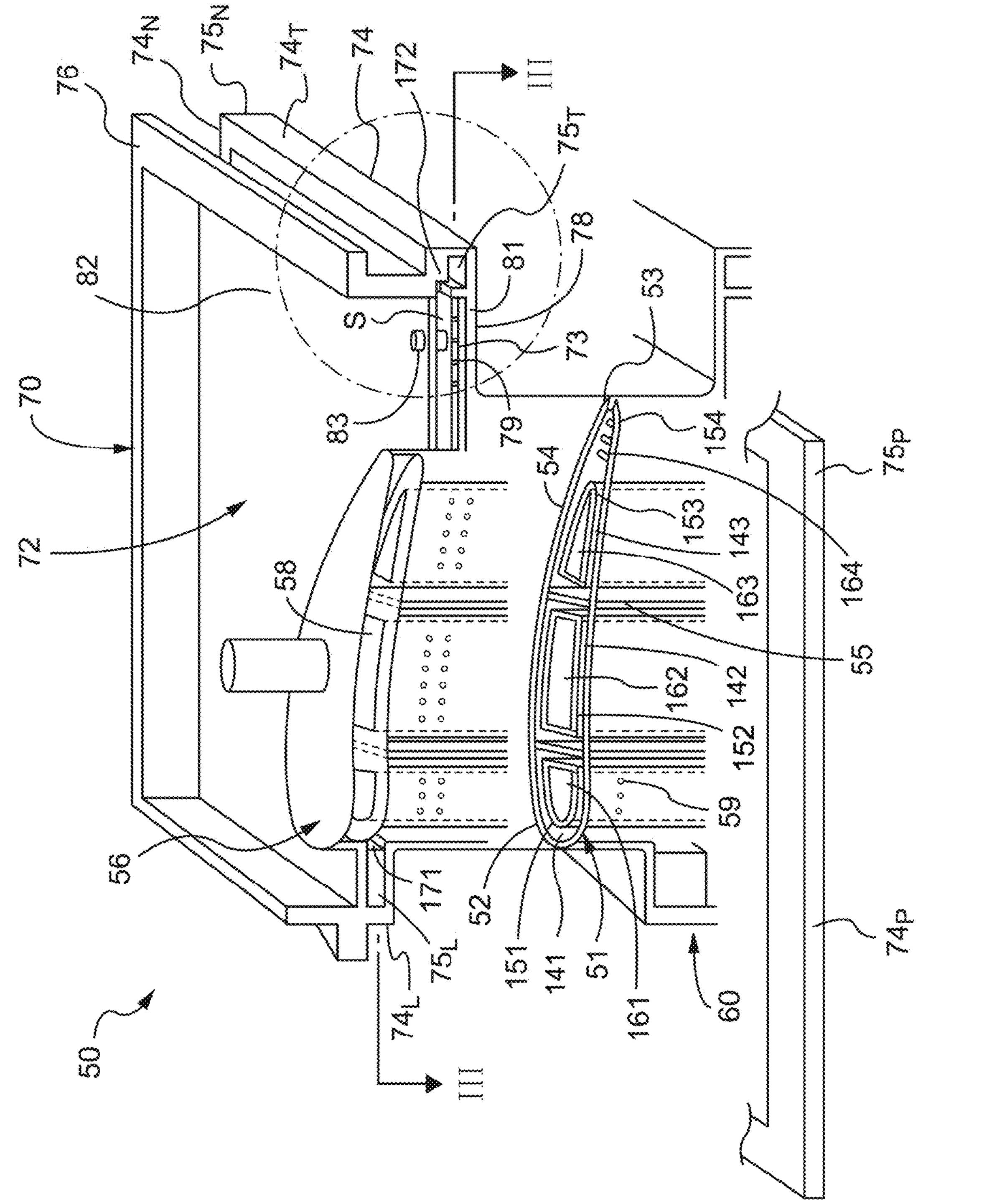
FIG. 2 is a perspective view of a stator vane in a first embodiment.
Figure 3:
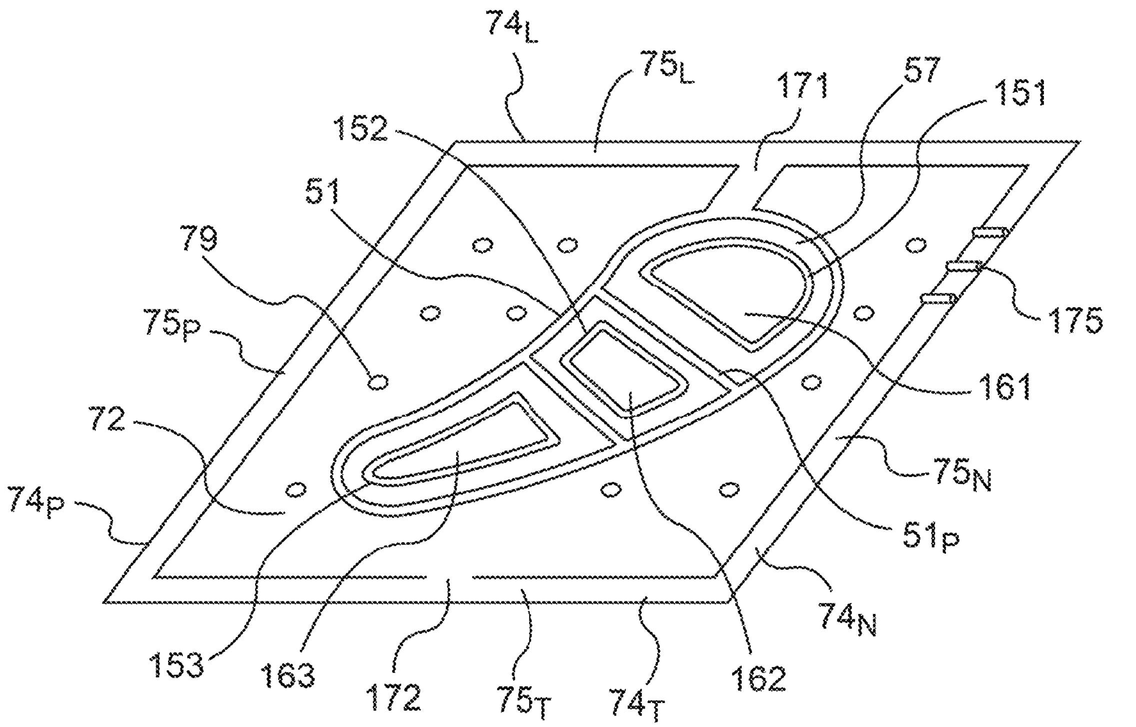
FIG. 3 is a sectional view taken along the line III-III of FIG. 2.
Figure 4:
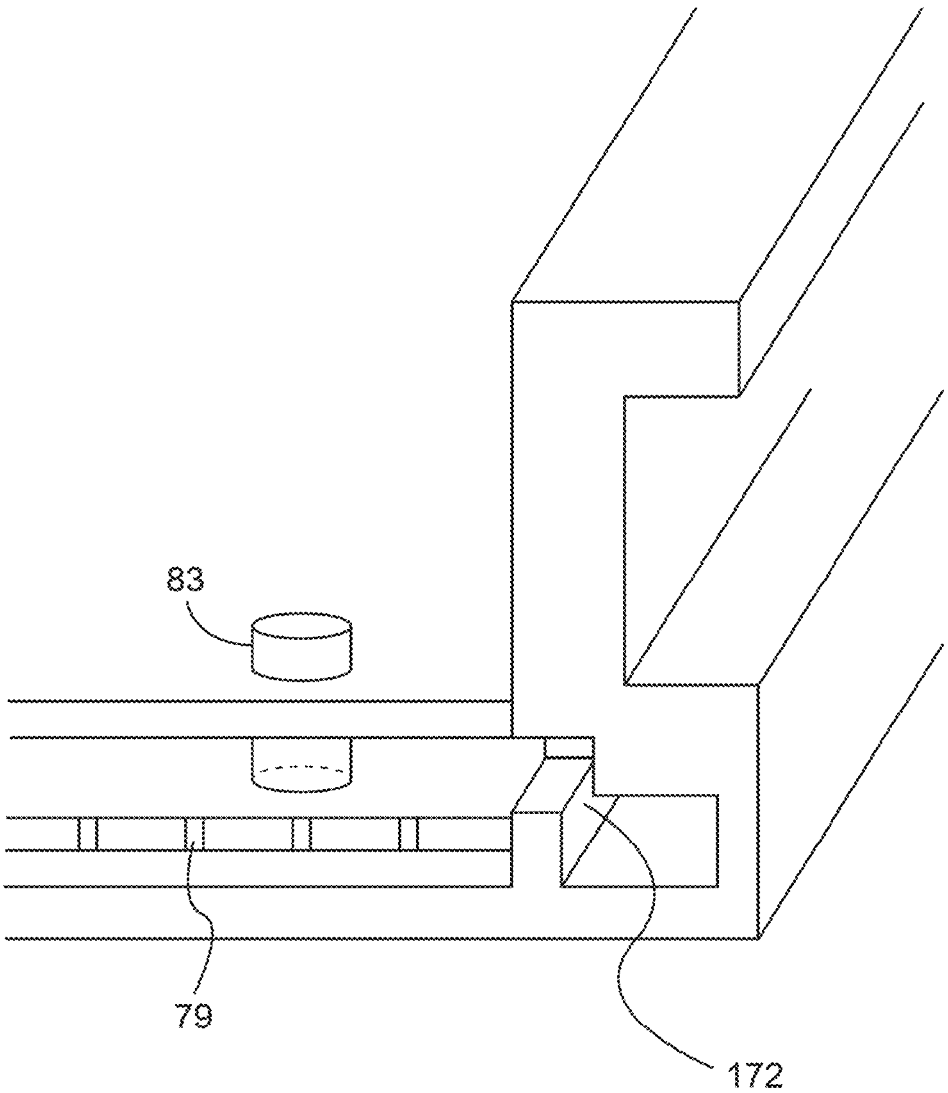
FIG. 4 is a partial enlargement view of the stator vane.

FIG. 2 schematically illustrates a stator vane of a gas turbine according to an embodiment of the present disclosure. FIG. 2 is a perspective view of a stator vane in a first embodiment. FIG. 3 is a sectional view taken along the line III-III of FIG. 2. FIG. 4 is a partial enlargement view of the stator vane. As shown in FIG. 2, a stator vane 50 includes a vane body (airfoil) 51 extending in a radial direction of a gas turbine, an inner shroud 60 disposed on the radially inner side of the vane body 51, and an outer shroud 70 disposed on the radially outer side of the vane body 51. The vane body 51 is disposed in a combustion gas flow passage (hot gas passage) through which the combustion gas passes. Generally, an annular combustion gas flow passage is defined by the inner shroud 60 on the radially inner side thereof and by the outer shroud 70 on the radially outer side thereof. The inner shroud 60 and the outer shroud 70 are plate-shaped members which define a part of the combustion gas flow passage.

As shown in FIG. 2, an end of the vane body 51 on the upstream side has a leading edge 52, and an end of the vane body 51 on the downstream side has a trailing edge 53. Among surfaces of the vane body 51, a convex surface is a suction-side surface 54 (negative pressure surface) and a concave surface is a pressure-side surface 55 (positive pressure surface). For the convenience purpose, in the following descriptions, the pressure side (positive pressure-surface side) of the vane body 51 and the suction side (negative pressure-surface side) of the vane body 51 will be referred to as a pressure side and a suction side, respectively.

The inner shroud 60 and the outer shroud 70 have basically the same structure. Therefore, the outer shroud 70 will be described primarily below.

As shown in FIG. 2 and FIG. 3, the outer shroud 70 is a plate-shaped shroud member which comprises a shroud main body 72, a shroud edge 74 disposed on a circumference of the shroud main body 72, and a peripheral wall 76 that extends along the shroud edge 74 and protrudes from the shroud main body 72 toward the radially outer side of the gas turbine.

The outer shroud 70 has a leading end surface being an end surface on the upstream side, a trailing end surface being an end surface on the downstream side, a pressure-side end surface being an end surface on the pressure side, a suction-side end surface being an end surface on the suction side. The outer shroud 70 has a gas path surface 78 facing the radially inner side and facing the hot gas passage. The leading end surface and the trailing end surface are substantially parallel to each other. The pressure-side end surface and the suction-side end surface are substantially parallel to each other. Thus, when seen from the radial direction, the outer shroud 70 has a substantially parallelogram shape as shown in FIG. 3.

The shroud edge 74 is a brim or rim shaped structure projecting from the shroud main body 72. The shroud edge 74 includes a leading-side shroud edge $\mathbf{74}_L$ disposed on the upstream side of the outer shroud 70, a trailing-side shroud edge $\mathbf{74}_T$ disposed on the downstream side of the outer shroud 70, a suction-side shroud edge $\mathbf{74}_N$ disposed on the suction side of the outer shroud 70, and a pressure-side shroud edge $\mathbf{74}_P$ disposed on the pressure side of the outer shroud 70. For example, as shown by FIG. 3, the leading-side shroud edge $\mathbf{74}_L$, the trailing-side shroud edge $\mathbf{74}_T$, the suction-side shroud edge $\mathbf{74}_N$, and the pressure-side shroud edge $\mathbf{74}_P$ are disposed on a circumference of the shroud main body 72 to entirely surround the shroud main body 72.

The leading-side shroud edge $\mathbf{74}_L$ includes a leading-side shroud edge passage $\mathbf{75}_L$ inside thereof. The trailing-side shroud edge $\mathbf{74}_T$ includes a trailing-side shroud edge passage $\mathbf{75}_T$ inside thereof. The suction-side shroud edge $\mathbf{74}_N$ includes a suction-side shroud edge passage $\mathbf{75}_N$ inside thereof. The pressure-side shroud edge $\mathbf{74}_P$ includes a pressure-side shroud edge passage $\mathbf{75}_P$ inside thereof.

In this embodiment, the leading-side shroud edge passage $\mathbf{75}_L$ is communicated with the suction-side shroud edge passage $\mathbf{75}_N$ at one end thereof and communicated with the pressure-side shroud edge passage $\mathbf{75}_P$ at the other end thereof. The trailing-side shroud edge passage $\mathbf{75}_T$ is communicated with the suction-side shroud edge passage $\mathbf{75}_N$ at one end thereof and communicated with the pressure-side shroud edge passage $\mathbf{75}_P$ at the other end thereof. As shown by FIG. 2, FIG. 3 and FIG. 4, the leading-side shroud edge passage $\mathbf{75}_L$ has a shroud edge passage inlet 171. The trailing-side shroud edge passage $\mathbf{75}_T$ has a shroud edge passage outlet 172. Part of cooling air which flows into the leading-side shroud edge passage $\mathbf{75}_L$ through the shroud edge passage inlet 171 flows through the suction-side shroud edge passage $\mathbf{75}_N$ and the pressure-side shroud edge passage $\mathbf{75}_P$, then flows through the trailing-side shroud edge passage $\mathbf{75}_T$, and then, flows out from the shroud edge passage outlet 172. As shown by FIG. 3, the shroud edge passages $\mathbf{75}_L$, $\mathbf{75}_T$, $\mathbf{75}_P$, $\mathbf{75}_N$ include turbulators 175. The turbulator 175 may be a rib disposed on an inner surface of the shroud edge passages. To enhance cooling of the shroud edge, the turbulator 175 may be disposed on a bottom surface of the passage which defines a radially inner side of the passage. Here, the bottom surface of the passage may be extended substantially parallel to the radially inner wall 81. Also, the turbulator 175 may be disposed on a side surface of the passage which defines an outer lateral side of the passage.

In the present embodiment, the shroud edge passage inlet 171 is provided to the leading-side shroud edge passage $75_L$ and the shroud edge passage outlet 172 is provided to the trailing-side shroud edge passage $75_T$. However, the structure of the stator vane is not limited to this embodiment. The shroud edge passage inlet 171 may be provided to other shroud edge passage such as the suction-side shroud edge passage $75_N$, the pressure-side shroud edge passage $75_P$, or the trailing-side shroud edge passage $75_T$. The shroud edge passage outlet 172 may be provided to other shroud edge passage such as the suction-side shroud edge passage $75_N$, the pressure-side shroud edge passage $75_P$, or the leading-side shroud edge passage $75_1$. Alternatively, a plurality of the shroud edge passage inlets 171 may be provided to either one or more of the shroud edge passages $75_L$, $75_T$, $75_N$, $75_P$. Moreover, a plurality of the shroud edge passage outlets 172 may be provided to either one or more of the shroud edge passages $75_L$, $75_T$, $75_N$, $75_P$.

The shroud main body 72 comprises a radially inner wall 81 and a radially outer wall 82 opposite to the radially inner wall 81. The shroud main body 72 contains a hollow space S inside thereof between the radially inner wall 81 and the radially outer wall 82. The radially inner surface of the inner wall 81 constitutes the gas path surface 78 of the outer shroud 70. The radially inner wall 81 constitutes a part of the shroud main body 72. The radially inner wall 81 may be continuously extended outward to constitute a part of the shroud edge 74. FIG. 2 describes, as an embodiment, that the radially inner wall 81 is continuously extended outward to constitute a part of the trailing-side shroud edge $74_T$. The shroud main body 72 contains an impingement plate 73 that partitions the space S of the outer shroud 70 into an outer region on the radially outer side and an inner region (cavity) that is a region on the radially inner side. The outer region is connected to the shroud edge passage outlet 172 such that part of cooling air flows from the trailing-side shroud edge passage $75_T$ into the outer region. The inner region is defined between the impingement plate 73 and the radially inner wall 81 of the outer shroud 70.

In the impingement plate 73, a plurality of air holes 79 are provided to extend through the impingement plate 73 in the radial direction. Part of cooling air present in the outer region flows into the inner cavity through the air holes 79 of the impingement plate 73. The cooling air is jetted from air holes 79 toward a radially outer surface of the radially inner wall 81 for impingement cooling of the radially outer surface of the radially inner wall 81, and then, is ejected through the radially outer wall 82 toward the outer side of the outer wall 82. For example, the cooling air is jetted from air holes 79 toward a radially outer surface of the radially inner wall 81 for impingement cooling of the radially outer surface of the radially inner wall 81, and then, is ejected through a passage which connects the inner region (cavity) of the hollow space(S) and an outside space located on the opposite side of the radially outer wall 82 with respect to the hollow space (S). Such a passage may be isolated from the outer region of the hollow space (S). More specifically, in this embodiment, the cooling air is ejected through a hole of an exit conduit 83. The exit conduit 83 is provided to penetrate through the radially outer wall 82 and the impingement plate 73 to connect the inner region and the outside space.

Airfoil

The vane body 51 comprises a plurality of air channels 141, 142, 143. More specifically, inside of the vane body 51 is partitioned by radially extending partition walls $51_P$ into the plurality of air channels 141, 142, 143. A plurality of inserts 151, 152, 153 are inserted into the respective air channels 141, 142, 143. The plurality of inserts 151, 152, 153 which include respective radially extending inner air channels 161, 162, 163 extend in the radial direction from the outer shroud 70 through the vane body 51 to the inner shroud 60. Each of the inserts 151, 152, 153 is formed continuously from the outer shroud 70 through the vane body 51 to the inner shroud 60. Each of the inner air channels 161, 162, 163 has an air inlet 58 open to the inside of an intake manifold 56.

Each of the inserts 151, 152, 153 has a plurality of apertures (through holes) 59 communicated with the respective inner air channels 161, 162, 163. Part of cooling air which is supplied to the inner air channels 161, 162, 163 of the inserts 151, 152, 153 is jetted from the plurality of apertures 59 toward an inner surface of the vane body 51 for impingement cooling of the inner surface of the airfoil 51. The plurality of air channels 141, 142, 143 have respective outer air channels defined between the inserts 151, 152, 153 and the inner surface of the vane body 51. The part of cooling air which is jetted through the apertures 59 is guided by and flows through the outer air channels in the radially outer direction, in the radially inner direction, or in both the radially outer and inner directions through the outer air channels. As an example, FIG. 3 shows the outer air channel 57 between the side surface of the insert 151 and the inner surface of the leading end part of the vane body 51.

The intake manifold 56 and the exit conduit 83 are connected to a forced air cooling system in which cooling air extracted from an inside of a combustor casing is cooled by an external cooler (not shown), and then, compressed by an external compressor (not shown). The compressed air is used for cooling and then returned to the inside of the combustor casing. In the above-description, the air cooling system is applied to the present embodiment. However, the present stator vane is not limited to such embodiment. The present disclosure may be applied to other type of cooling system. For example, the intake manifold 56 and the exit conduit 83 may be connected to a closed-loop steam cooling system or closed-loop air cooling system. The compressed air used for cooling is supplied to the intake manifold and directly provided to the air inlet 58 first without going through the shroud main body 72 nor the shroud edge 74. In other words, the cooling air is first used for cooling the airfoil 51 before used for cooling the shroud main body 72 or the shroud edge 74.

In the present embodiment, the air channel 141 is a leading end air channel positioned at an upstream end of the vane body 51. For example, in the insert 151 which is a leading end insert, part of cooling air which is supplied to the inner air channel 161 through the air inlet 58 is jetted through the apertures 59 toward the inner surface of the leading end part of the airfoil 51, and then is guided to flow in the radially outer direction through the outer air channel 57. The outer air channel 57 which is a space between the insert 151 and the inner surface of the leading end part of the vane body 51 is communicated with the shroud edge passage inlet 171 of the leading-side shroud edge passage $75_L$. The part of cooling air which is jetted toward the inner surface of the leading end part of the airfoil 51 flows into the shroud edge passage inlet 171 of the leading-side shroud edge passage $75_L$ through the outer air channel 57 which is connected to the shroud edge passage inlet 171.

Figure 5:
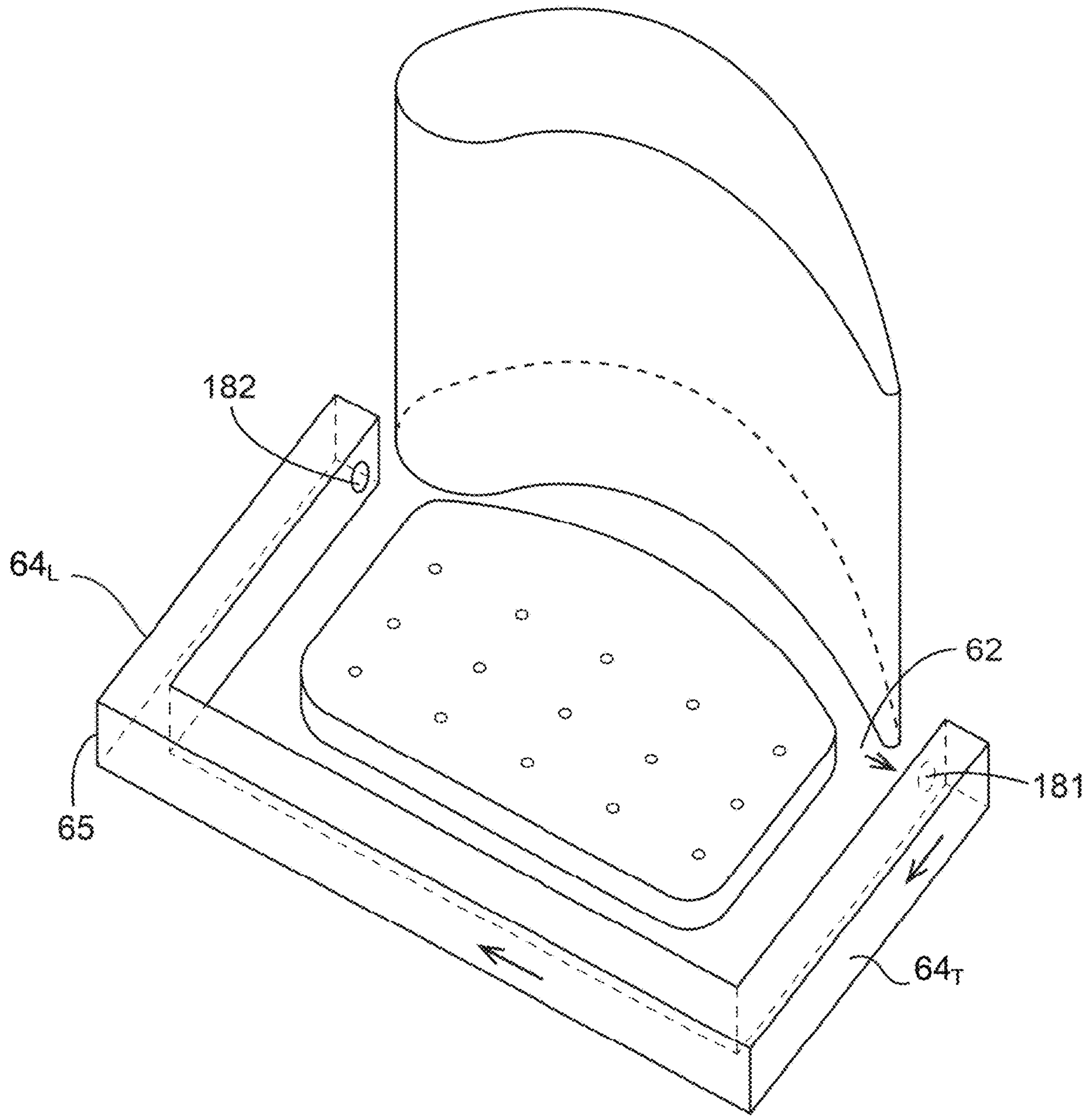
FIG. 5 is a perspective view of a part of a stator vane in the first embodiment.

FIG. 5 is a perspective view of a part of a stator vane in the first embodiment. In the present embodiment, the air channel 142 is an intermediate air channel positioned on a downstream side of the leading end air channel 141 and also positioned between the leading end air channel 141 and a trailing end air channel 143 (described below). For example, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially inner direction through own outer air channel toward the inner shroud 60, then, as shown by FIG. 5, flows into the shroud edge passage inlet 181 of the inner shroud 60 (disposed on a trailing-side shroud edge $64_T$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on a leading-side shroud edge $64_L$). In similar manner to the outer shroud 70, the cooling air is jetted from the air holes of the impingement plate 63 to cool the radially outer wall of the inner shroud 60 which has a gas path surface facing radially outer side and facing the hot gas path.

In the present embodiment, part of cooling air which is jetted from the leading end inner air channel 161 toward the inner surface of the leading end part of the airfoil 51 is guided to flow in the radially outer direction through the outer air channel 57 toward the outer shroud 70. Also, part of cooling air which is jetted from the intermediate inner air channel 162 toward the inner surface of the intermediate part of the airfoil 51 is guided to flow in the radially inner direction through the outer air channel 57 toward the inner shroud 60. However, the structure of the stator vane is not limited to this embodiment. Part of cooling air which is jetted from the leading end inner air channel 161 toward the inner surface of the leading end part of the airfoil 51 may be guided to flow in the radially inner direction through the outer air channel 57 toward the inner shroud 60. Also, part of cooling air which is jetted from the intermediate inner air channel 162 toward the inner surface of the intermediate part of the airfoil 51 may be guided to flow in the radially outer direction through the outer air channel 57 toward the outer shroud 70. Such modification will be further described below as another embodiment.

In some embodiments of this disclosure, as shown by FIG. 2, the air channel 143 is a trailing end air channel positioned at a downstream end of the vane body 51. The trailing end air channel 143 also includes an airfoil cooling structure 154 on a downstream side of the insert 153. The airfoil cooling structure 154 includes a passage inside of which a plurality of pin fins 164 are disposed. For example, in the insert 153 which is a trailing end insert, part of cooling air which is supplied to the inner air channel (trailing end inner air channel) 163 through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

Figure 6:
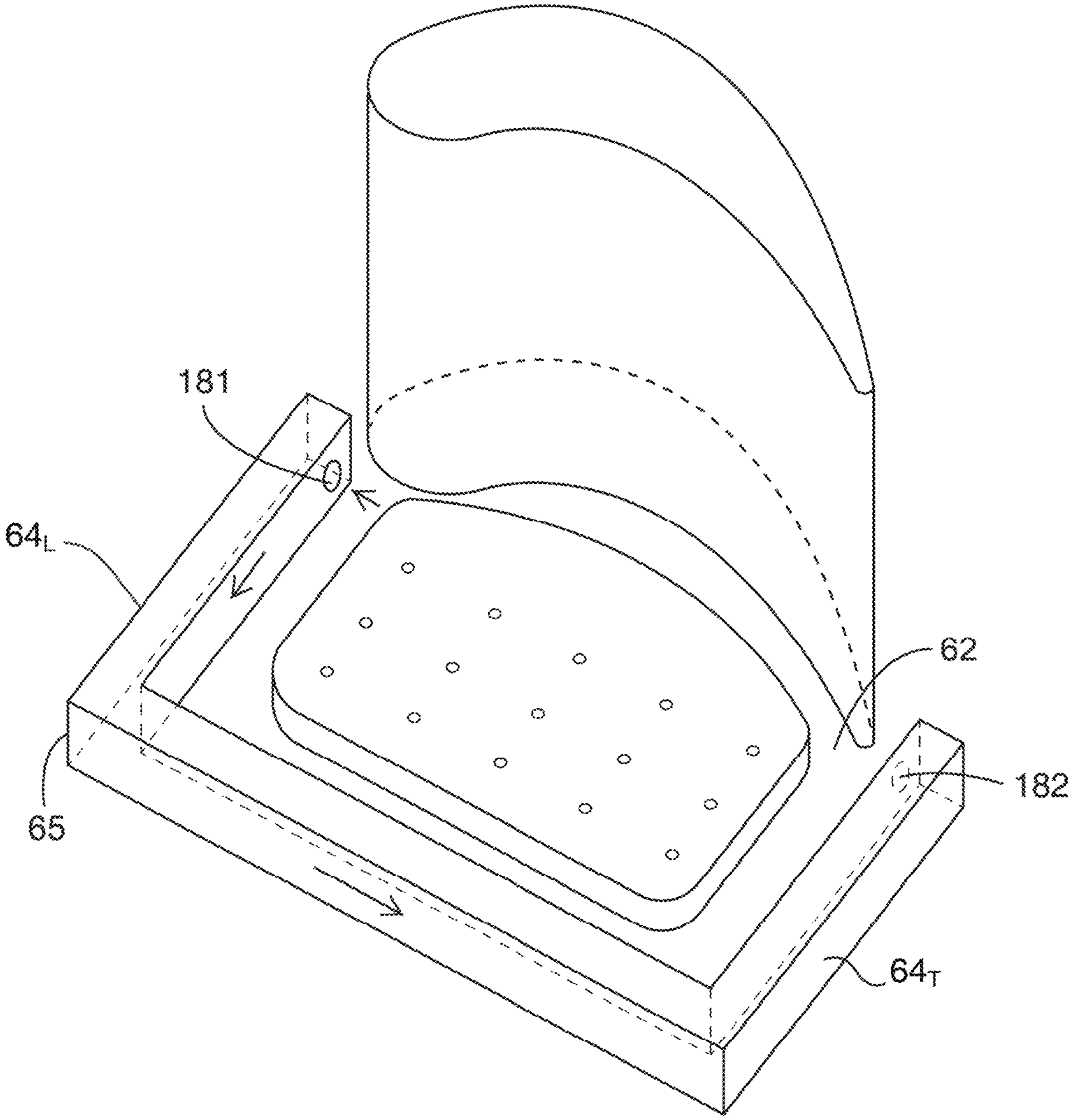
FIG. 6 is a perspective view of a part of a stator vane in another embodiment.

FIG. 6 is a perspective view of a part of a stator vane in another embodiment. As shown by FIG. 6, in this embodiment, the shroud edge passage inlet 181 of the inner shroud 60 is disposed on the leading-side shroud edge $64_L$. Also, the shroud edge passage outlet 182 of the inner shroud 60 is disposed on the trailing-side shroud edge $64_T$. Also, in this embodiment, the shroud edge passage inlet 171 of the outer shroud 70 is disposed on the trailing-side shroud edge $74_T$. Also, the shroud edge passage outlet 172 of the outer shroud 70 is disposed on the leading-side shroud edge $74_L$. In this embodiment, in the insert 151 which is the leading end insert, part of cooling air which is supplied to the inner air channel 161 through the air inlet 58 is jetted through the apertures 59 toward the inner surface of the leading end part of the airfoil 51, and then is guided to flow in the radially inner direction through the outer air channel 57 toward the inner shroud 60, then, as shown by FIG. 6, flows into the shroud edge passage inlet 181 of the inner shroud 60 (disposed on the leading-side shroud edge $64_L$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on the trailing-side shroud edge $64_T$). Also, in this embodiment, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially outer direction through the outer air channel toward the outer shroud 70, then flows into the shroud edge passage inlet 171 of the outer shroud 70 (disposed on the trailing-side shroud edge $74_T$). The cooling air then flows through the shroud edge passage 75 of the outer shroud 70 to cool the shroud edge 74 of the outer shroud 70, and then, flows into the shroud main body 72 of the outer shroud 70 through the shroud edge passage outlet 172 of the outer shroud 70 (disposed on the leading-side shroud edge $74_L$).

Cooling Method

Figure 7:
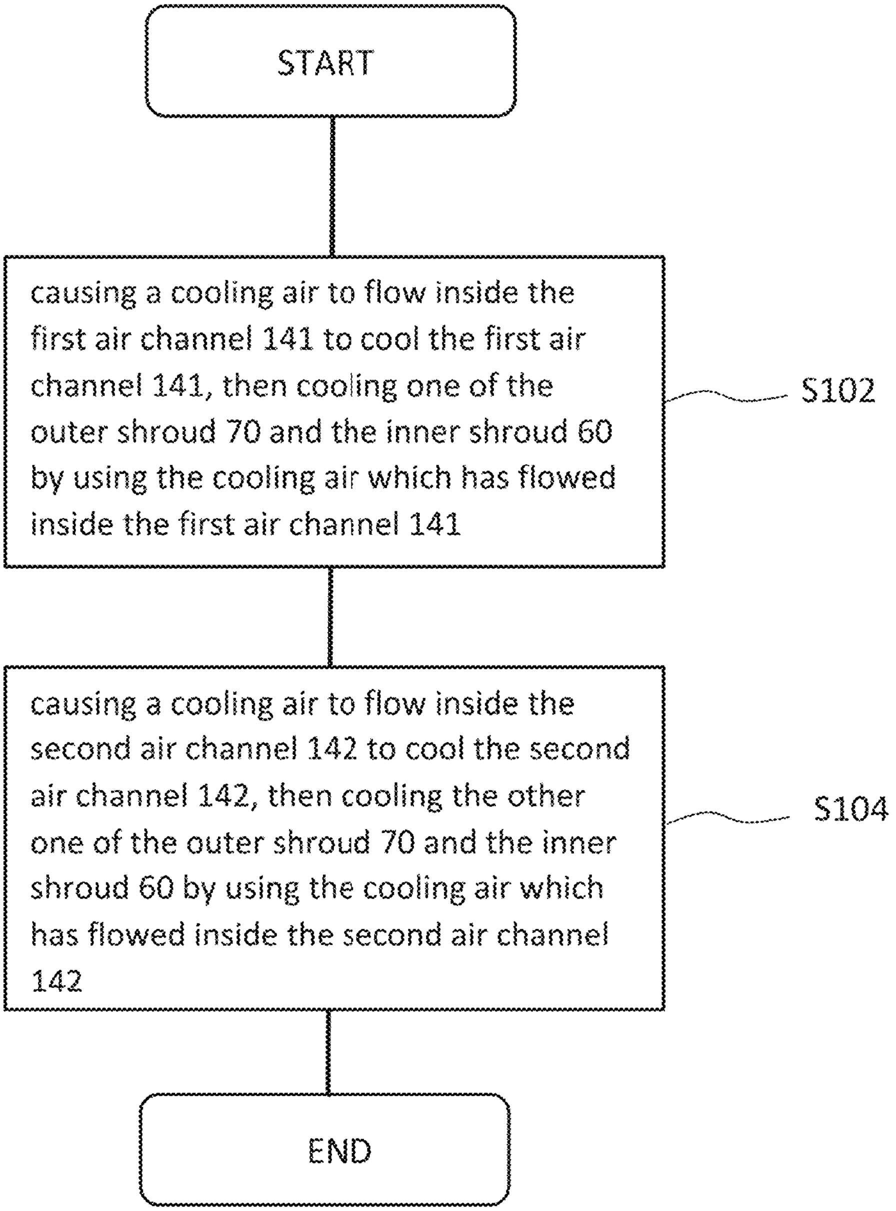
FIG. 7 is a flowchart illustrating a cooling method of the stator vane of the first embodiment.

Next, a cooling method of a stator vane of the first embodiment is described. FIG. 7 is a flowchart illustrating a cooling method of the stator vane of the first embodiment. As shown by FIG. 7, at a step S102, part of cooling air is caused to flow into the leading end air channel 141 to cool the leading end air channel 141. The cooling air is jetted from the leading end inner air channel 161 through the apertures 59 of the insert 151 toward the inner surface of the leading end part of the airfoil 51, and is guided in either one of the radially outer direction or the radially inner direction through the outer air channel 57 toward the outer shroud 70 or the inner shroud 60 to cool the outer shroud 70 or the inner shroud 60.

At a step S104, part of cooling air is caused to flow into the intermediate air channel 142 to cool the intermediate air channel 142. The cooling air is jetted from the intermediate inner air channel 162 through the apertures 59 of the insert 152 toward the inner surface of the intermediate part of the airfoil 51, and is guided in the other one of the radially outer direction or in the radially inner direction through the outer air channel 57 toward the outer shroud 70 or the inner shroud 60 to cool the other one of the outer shroud 70 or the inner shroud 60.

Figure 8:
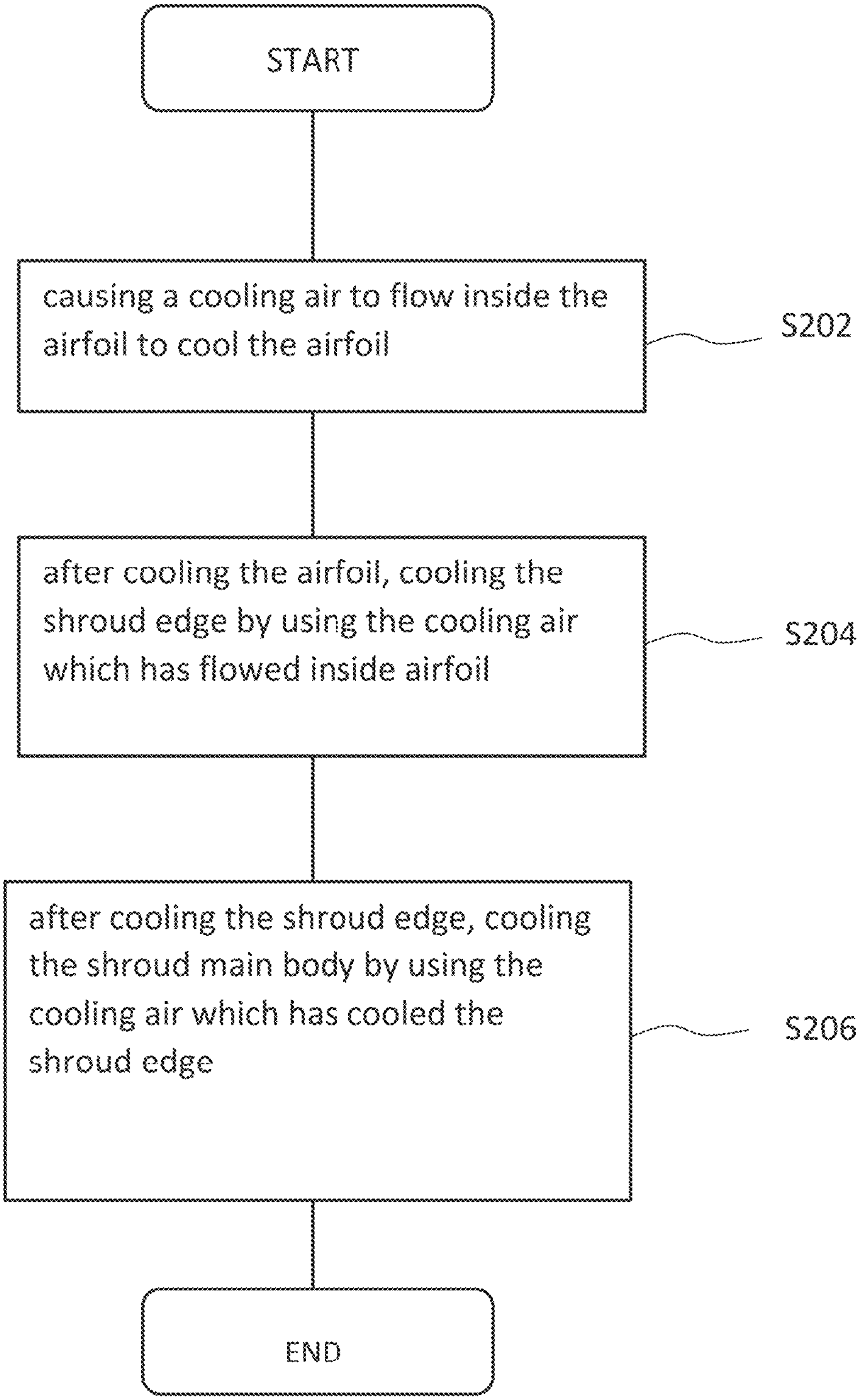
FIG. 8 is a flowchart illustrating a cooling method of the stator vane of the second embodiment.
Figure 9:
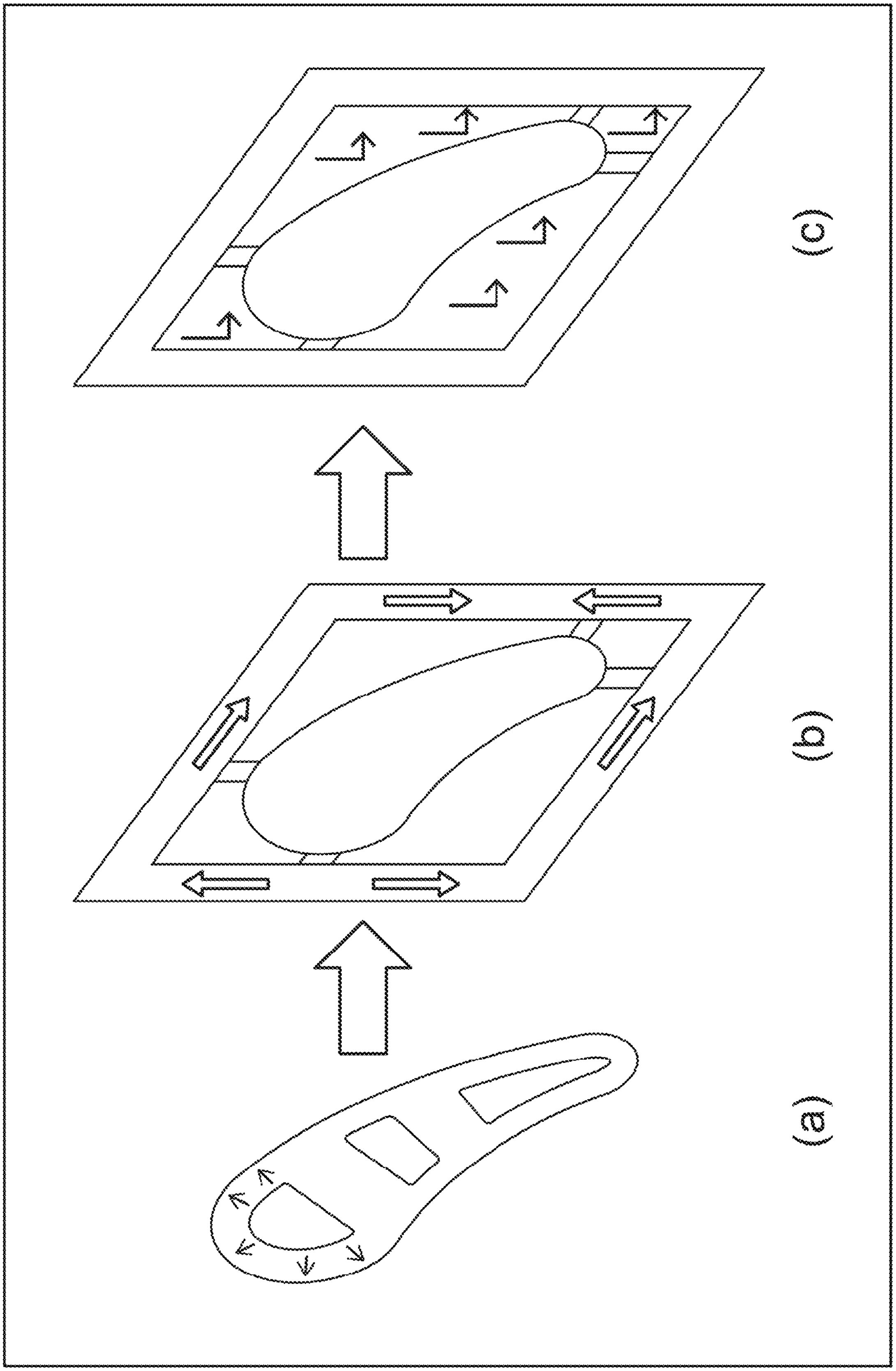
FIG. 9 schematically illustrates cooling steps of the second embodiment.

Next, a cooling method of a stator vane of the second embodiment is described. FIG. 8 is a flowchart illustrating a cooling method of the stator vane of the second embodiment. This method is described by using the air channel 141 and the outer shroud 70 as examples. FIG. 9 schematically illustrates cooling steps of the second embodiment. As shown by FIG. 8 and FIG. 9(*a*), at a step S202, part of cooling air is caused to flow into the inner air channel 161 of the insert 151 through the air inlet 58. The cooling air is then jetted through the apertures 59 toward the inner surface of the leading end part of the airfoil 51 to cool the airfoil 51, and then, flows in the radially outer direction through the outer air channel 57. In some of this embodiment, the part of cooling air which is caused to flow into the inner air channel 161 may be introduced from the forced air cooling system.

As shown by FIG. 9(*b*), at a step S204, the cooling air is caused to flow into the shroud edge passage 75 through the shroud edge passage inlet 171. The cooling air flows along and through the shroud edge passage 75 to cool the shroud edge 75.

As shown by FIG. 9(*c*), at a step S206, the cooling air flows into the outer region of the shroud main body 72 and is jetted through the air holes 79 toward the radially outer surface of the radially inner wall 81 for impingement cooling of the radially outer surface of the radially inner plate 81 to cool the shroud main body 72.

Figure 10:
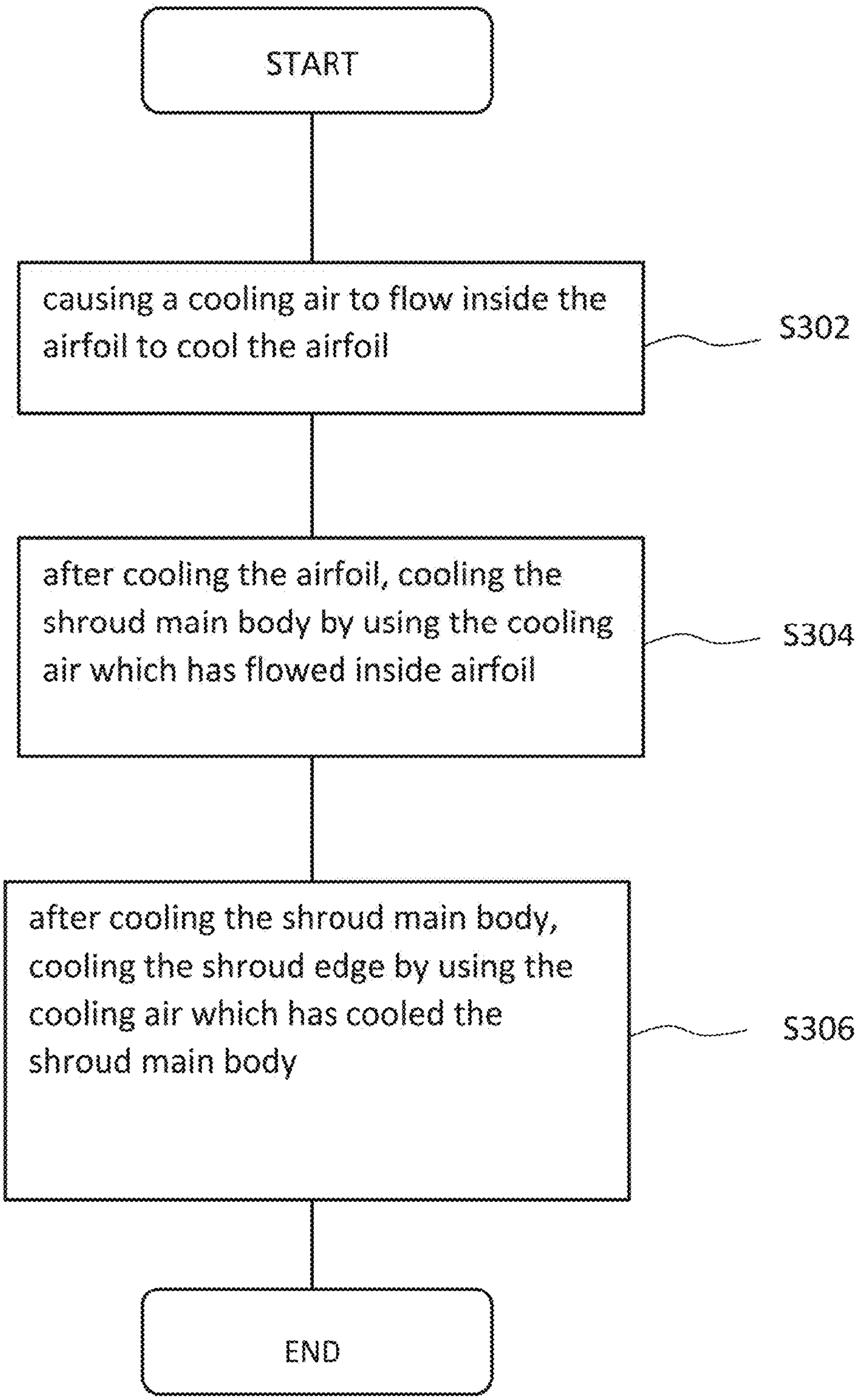
FIG. 10 is a flowchart illustrating a cooling method of the stator vane of the third embodiment.

Next, a cooling method of a stator vane of third embodiment is described. FIG. 10 is a flowchart illustrating a cooling method of the stator vane of the third embodiment. As shown by FIG. 10, at a step S302, in at least one of the air channels, part of cooling air is caused to flow into the inner air channel of the insert through the air inlet. The cooling air is then jetted through the apertures toward the inner surface of the leading end part of the airfoil to cool the airfoil, and then, flows in the radially outer direction through the outer air channel. In some of this embodiment, the part of cooling air which is caused to flow into the inner air channel may be introduced from the forced air cooling system.

At a step S304, the cooling air is caused to flow into the outer region of the shroud main body and is jetted through the air holes toward the radially outer surface of the radially inner wall for impingement cooling of the radially outer surface of the radially inner wall to cool the shroud main body.

At a step S306, the cooling air is caused to flow into shroud edge passage through the shroud edge passage inlet. The cooling air flows along and through the shroud edge passage to cool the shroud edge. In some of this embodiment, the cooling air may be returned to the forced air cooling system through the shroud edge passage outlet.

Figure 11:
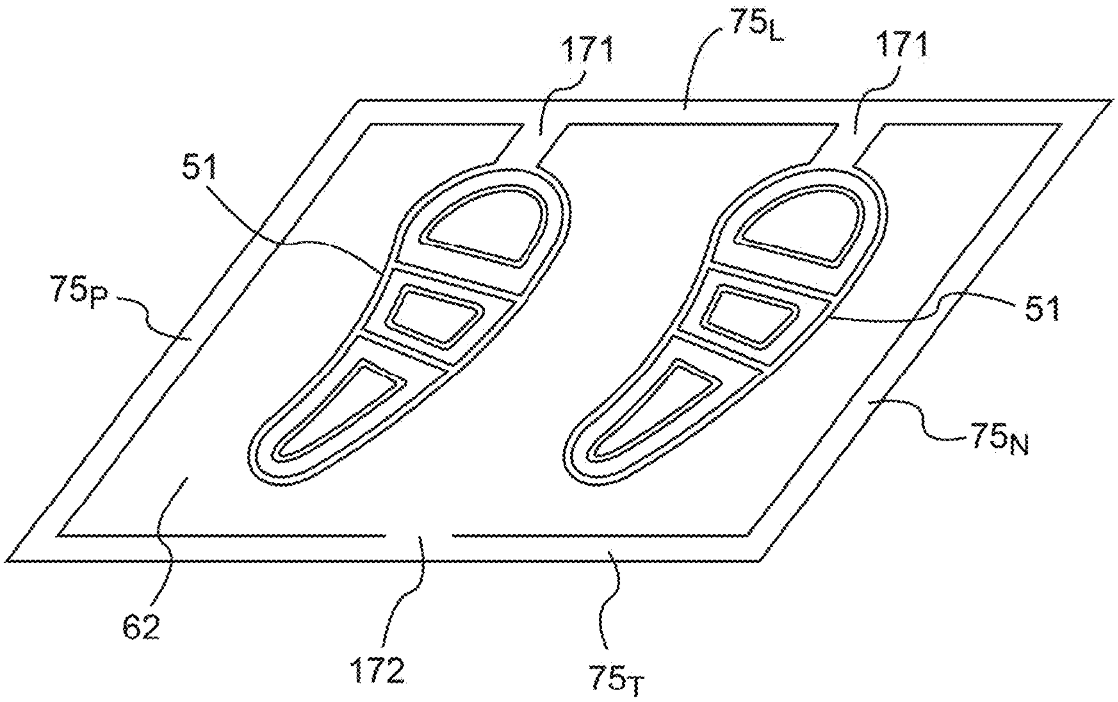
FIG. 11 is a schematic sectional view of a stator vane according to the fourth embodiment.

Next, the fourth embodiment of the present application is described below. FIG. 11 is a schematic sectional view of a stator vane according to the fourth embodiment. As shown by FIG. 11, in the fourth embodiment, a plurality of the airfoils 51 (two airfoils in this embodiment) are surrounded by the shroud edge passages 75$_L$, 75$_T$, 75$_N$, 75$_P$. Differently from the first embodiment (FIG. 3), two shroud edge passage inlets 171 are provided to the leading-side shroud edge passage 75$_L$.

The respective outer air channels which is a space between the insert 151 and the inner surface of the leading end part of the two airfoils 51 are communicated with the respective shroud edge passage inlets 171 of the leading-side shroud edge passage 75$_L$ through the respective air passages provided in an outer end of the respective outer air channels of the respective airfoils 51. The cooling air flows into the leading-side shroud edge passage 75$_L$ through the respective shroud edge passage inlets 171 and flows through the suction-side shroud edge passage 75$_N$, or the pressure-side shroud edge passages 75$_P$, then flows into the outer region of the shroud main body 72 through the shroud edge passage outlet 172.

In the above embodiments, the vane body (airfoil) includes three air channels 141, 142, 143. However, the number of the air channels included in the vane body (airfoil) is not limited to three. The vane body (airfoil) may include different number of air channels such as two, four, five or more. In such a modified embodiment, each air channel may be connected to the outer shroud or the inner shroud.

Figure 12B:
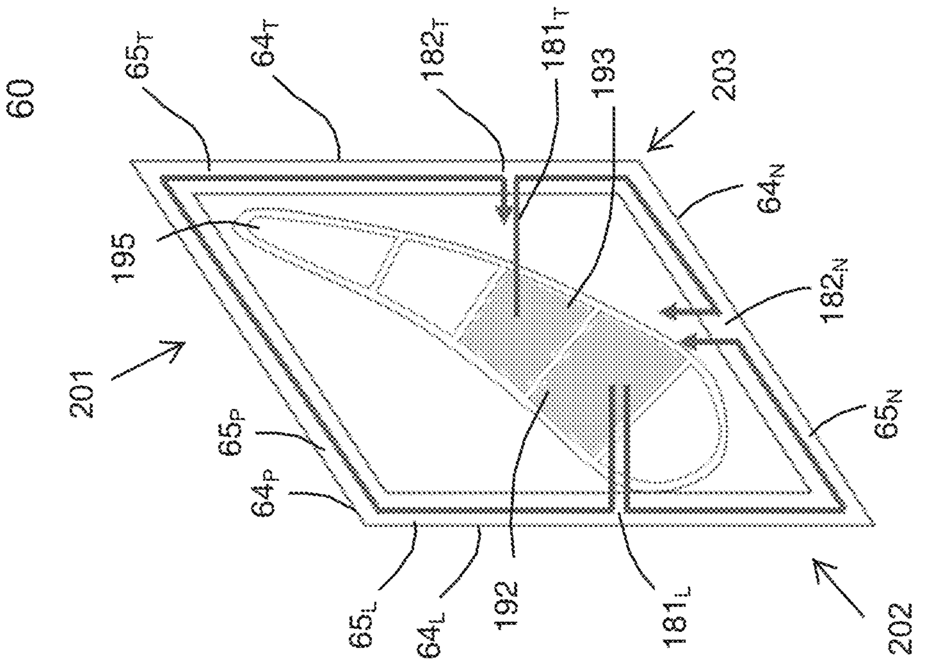
FIGS. 12A and 12B are respectively a schematic sectional view of a stator vane according to the fifth embodiment.
Figure 12A:
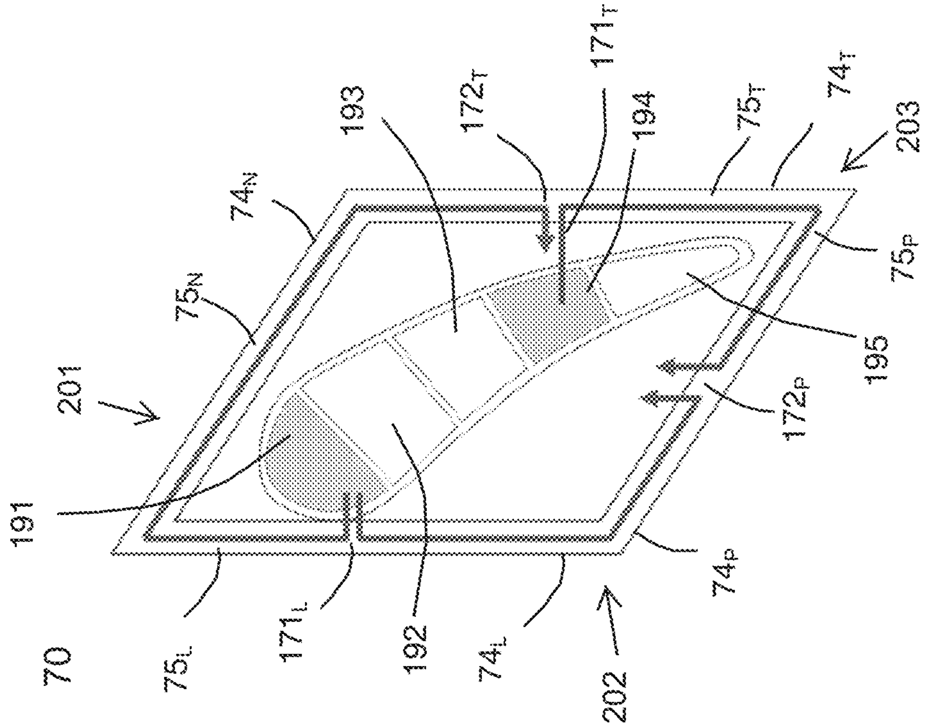
Figure 13:
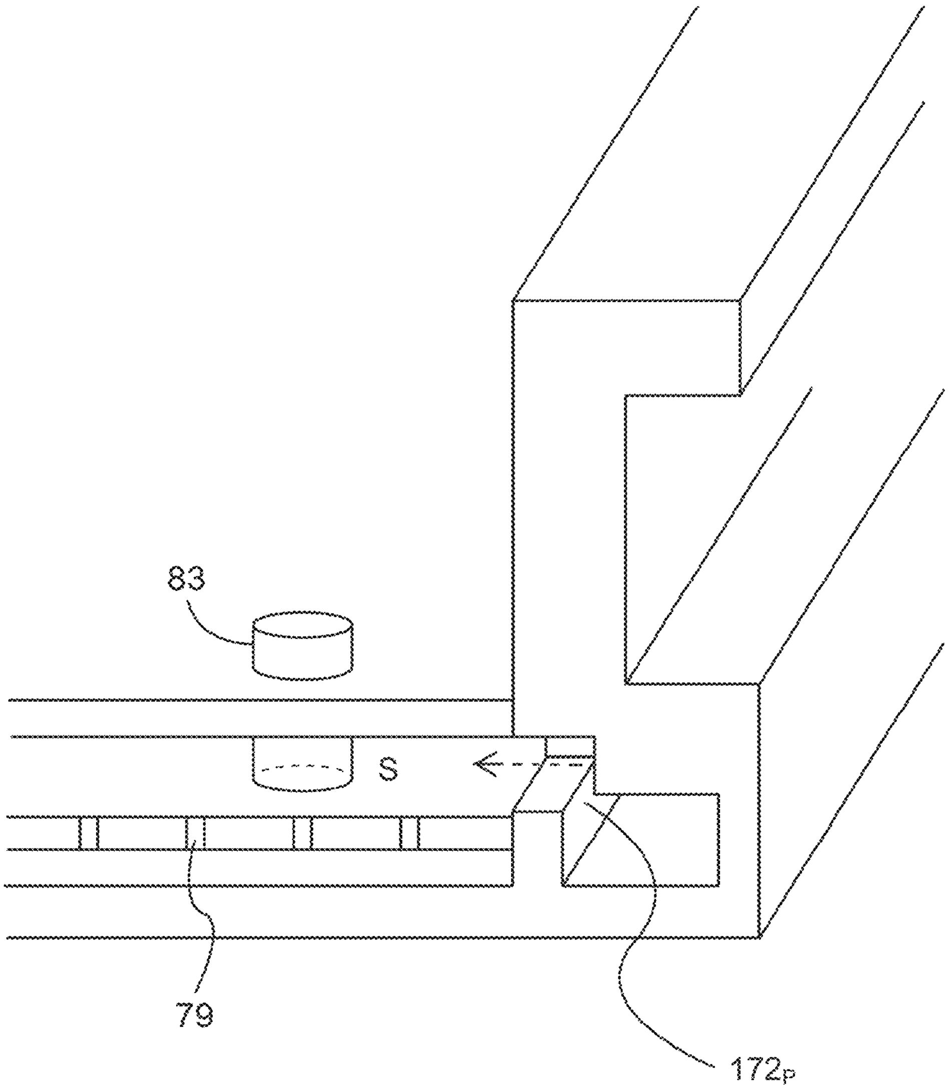
FIG. 13 is a partial enlargement view of the stator vane according to the fifth embodiment.

Next, the fifth embodiment of the present application is described below. FIGS. 12A and 12B are respectively a schematic sectional view of a stator vane according to the fifth embodiment. FIG. 13 is a partial enlargement view of the stator vane according to the fifth embodiment. FIGS. 12A and 12B respectively show an embodiment in which the shroud edge surrounds the shroud main body, and the shroud edge passage is divided into three sub-passages. In this embodiment, the outer shroud 70 includes two shroud edge passage inlets (a leading-side shroud edge passage inlet 171$_L$ and a trailing-side shroud edge passage inlet 171$_T$), and two shroud edge passage outlets (a pressure-side shroud edge passage outlet 172$_E$ and a trailing-side shroud edge passage outlet 172$_T$). The leading-side shroud edge passage inlet 171$_L$ is provided to the leading-side shroud edge 74$_L$. The trailing-side shroud edge passage inlet 171$_T$ is provided to the trailing-side shroud edge 74$_T$. The pressure-side shroud edge passage outlet 172$_P$ is provided to the pressure-side shroud edge 74$_P$. The trailing-side shroud edge passage outlet 172$_T$ is provided to the trailing-side shroud edge 74$_T$. Also, in this embodiment, the vane body (airfoil) includes air channels 191, 192, 193, 194 and 195 located in this order from an upstream end to a downstream end thereof with respect to the flow of hot gas in the turbine. The air channels 191, 192, 193, 194 and 195 respectively includes an insert and an inner air channel (not shown).

In this embodiment, the inner shroud 60 includes two shroud edge passage inlets (a leading-side shroud edge passage inlet 181$_L$ and a trailing-side shroud edge passage inlet 181$_T$), and two shroud edge passage outlets (a trailing-side shroud edge passage outlet 182$_T$ and a suction-side shroud edge passage outlet 182$_H$). The leading-side shroud edge passage inlet 181$_L$ is provided to the leading-side shroud edge 64$_L$. The trailing-side shroud edge passage inlet 181$_T$ is provided to the trailing-side shroud edge 64$_T$. The trailing-side shroud edge passage outlet 182$_T$ is provided to the trailing-side shroud edge 64$_T$. The suction-side shroud edge passage outlet 182$_N$ is provided to the suction-side shroud edge 64$_N$.

As shown by FIG. 12A, the first air channel 191 is communicated with the shroud edge passage inlet 171$_L$ of the outer shroud 70 disposed at the leading-side shroud edge 74$_L$. Also, the fourth air channel 194 is communicated with the shroud edge passage inlet 171$_T$ of the outer shroud 70 disposed at the trailing-side shroud edge 74$_T$.

In FIG. 12A, the first sub-passage 201 is extended between the leading-side shroud edge passage inlet 171$_L$ and the trailing-side shroud edge passage outlet 172$_T$. The second sub-passage 202 is extended between the leading-side shroud edge passage inlet 171$_L$ and the pressure side shroud edge passage outlet 172$_P$. The third sub-passage 203 is extended between the trailing-side shroud edge passage inlet 171$_T$ and the pressure-side shroud edge passage outlet 172$_P$. For example, each of the first to third sub-passages has a cooling air inlet at one end thereof and a cooling air outlet at an opposite end thereof so as to have an airtight passage from the one end thereof through the opposite end thereof.

In this embodiment, for example, part of cooling air which is supplied to the first air channel 191 is jetted from a first inner air channel through the apertures 59 of a first insert toward the inner surface of the leading end part of the airfoil 51, and then is guided to flow in the radially outer direction through the own outer air channel toward the outer shroud 70, then, as shown by FIG. 12A, flows into the leading-side shroud edge passage inlet $\mathbf{171}_L$. The cooling air then flows along the leading-side shroud edge passage $\mathbf{75}_L$. Then, the cooling air flows along the pressure-side shroud edge passage $\mathbf{75}_P$, then flows out from pressure-side shroud edge passage outlet $\mathbf{172}_P$. The cooling air also flows along the suction-side shroud edge passage $\mathbf{75}_N$ and along the trailing-side shroud edge passage $\mathbf{75}_T$, then flows out from trailing-side shroud edge passage outlet $\mathbf{172}_T$. In this embodiment, for example, part of cooling air which is supplied to the fourth air channel 194 is jetted from a fourth inner air channel through the apertures 59 of a fourth insert toward the inner surface of the intermediate part of the airfoil 51, and then is guided to flow in the radially outer direction through the own outer air channel toward the outer shroud 70, then, as shown by FIG. 12A, flows into the trailing-side shroud edge passage inlet $\mathbf{171}_T$. The cooling air then flows along the trailing-side shroud edge passage $\mathbf{75}_T$. Then, the cooling air flows along the pressure-side shroud edge passage $\mathbf{75}_P$, then flows out from pressure-side shroud edge passage outlet $\mathbf{172}_P$.

As shown by FIG. 13, the pressure-side shroud edge passage outlet $\mathbf{172}_P$ is connected to the outer region of the hollow space S of the shroud main body 72 such that the cooling air flows into the outer region of the hollow space S of the shroud main body 72 and is jetted through the air holes 79 toward the radially outer surface of the radially inner wall 81 for impingement cooling of the radially outer surface of the radially inner plate 81 to cool the shroud main body 72. Then, the cooling air is ejected through a hole of an exit conduit 83. Also, the cooling air flows into the outer region of the hollow space S of the shroud main body 72 from trailing-side shroud edge passage outlet $\mathbf{172}_T$.

As shown by FIG. 12B, the second air channel 192 is communicated with the shroud edge passage inlet $\mathbf{181}_L$ of the inner shroud 60 disposed at the leading-side shroud edge $\mathbf{64}_L$. The third air channel 193 is communicated with the shroud edge passage inlet $\mathbf{181}_T$ of the inner shroud 60 disposed at the trailing-side shroud edge $\mathbf{64}_T$. In FIG. 12B, the suction-side shroud edge passage outlet $\mathbf{182}_N$ is provided to the suction-side shroud edge passage $\mathbf{65}_N$. Also, there is a shroud edge passage outlet $\mathbf{182}_T$ of the inner shroud 60 disposed at the trailing-side shroud edge $\mathbf{64}_T$. In FIG. 12B, the first sub-passage 201 is extended between the shroud edge passage inlet $\mathbf{181}_L$ and the shroud edge passage outlet $\mathbf{182}_T$. The second sub-passage 202 is extended between the shroud edge passage inlet $\mathbf{181}_L$ and the suction-side shroud edge passage outlet $\mathbf{182}_N$. The third sub-passage 203 is extended between the shroud edge passage inlet $\mathbf{181}_T$ and the suction-side shroud edge passage outlet $\mathbf{182}_N$.

In this embodiment, for example, part of cooling air which is supplied to the second air channel 192 is jetted from a second inner air channel through the apertures 59 of a second insert toward the inner surface of the intermediate part of the airfoil 51, and then is guided to flow in the radially inner direction through the own outer air channel toward the inner shroud 60, then, as shown by FIG. 12B, flows into the leading-side shroud edge passage inlet $\mathbf{181}_L$. The cooling air then flows along the leading-side shroud edge passage $\mathbf{65}_L$. Then, the cooling air flows along the suction-side shroud edge passage $\mathbf{65}_N$, then flows out from suction-side shroud edge passage outlet $\mathbf{182}_N$. The cooling air also flows along the pressure-side shroud edge passage $\mathbf{65}_P$ and along the trailing-side shroud edge passage $\mathbf{65}_T$, then flows out from trailing-side shroud edge passage outlet $\mathbf{182}_T$ to the shroud main body 62, for example, into the inner region of the hollow space S of the shroud main body 62. In similar manner to the outer shroud 70, the cooling air is jetted from the air holes of the impingement plate to cool the radially outer wall of the inner shroud 60 which has a gas path surface facing radially outer side and facing the hot gas path. In this embodiment, part of cooling air which is supplied to the third air channel 193 is jetted from a third inner air channel through the apertures 59 of a third insert toward the inner surface of the intermediate part of the airfoil 51, and then is guided to flow in the radially inner direction through the own outer air channel toward the inner shroud 60, then, as shown by FIG. 12B, flows into the trailing-side shroud edge passage inlet $\mathbf{181}_T$. The cooling air then flows along the trailing-side shroud edge passage $\mathbf{65}_T$. Then, the cooling air flows along the suction-side shroud edge passage $\mathbf{65}_N$, then flows out from suction-side shroud edge passage outlet $\mathbf{182}_N$ to the shroud main body 62, for example, into the inner region of the hollow space S of the shroud main body 62.

The fifth air channel 195 is a trailing end air channel positioned at a downstream end of the vane body 51. As described above, in the fifth air channel 195, part of cooling air which is supplied to a fifth inner air channel through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

The structure of the stator vane is not limited to this embodiment. For example, in FIG. 12A, the first sub-passage 201 can be configured to flow the cooling air in an opposite direction. That is, the trailing-side shroud edge passage outlet $\mathbf{172}_T$ can be moved to the leading-side shroud edge $\mathbf{75}_L$ as a leading-side shroud edge passage outlet $\mathbf{172}_L$ such that the cooling air flows inside the first sub-passage 201 from the trailing-side shroud edge passage inlet $\mathbf{171}_T$ toward the leading-side shroud edge passage outlet $\mathbf{172}_L$.

Figure 14B:
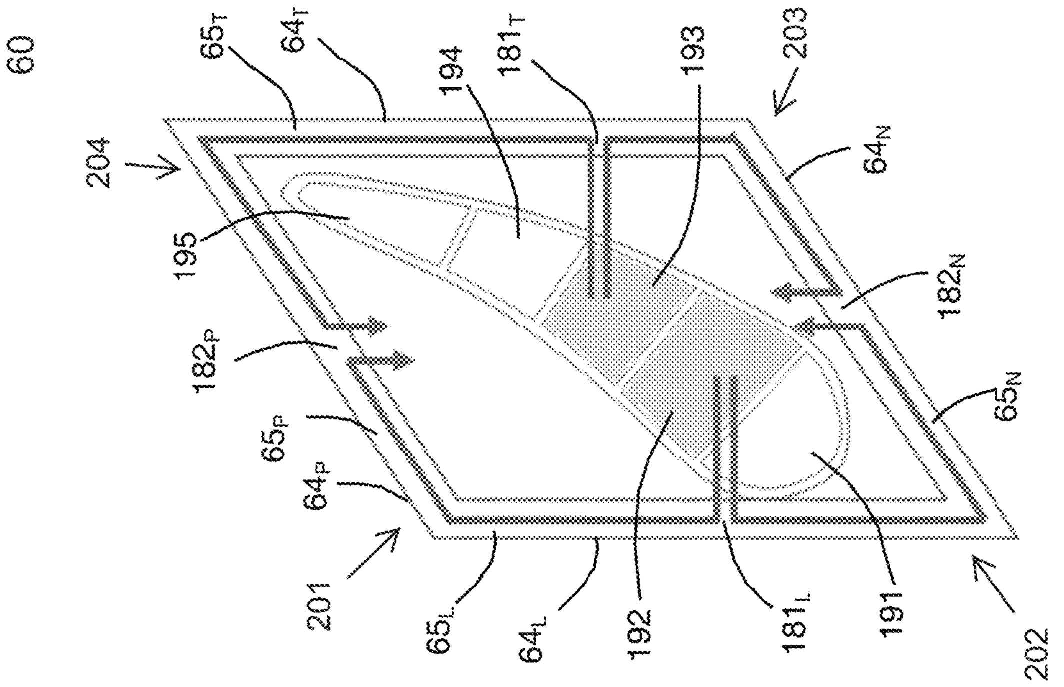
FIGS. 14A and 14B are respectively a schematic sectional view of a stator vane according to the sixth embodiment.
Figure 14A:
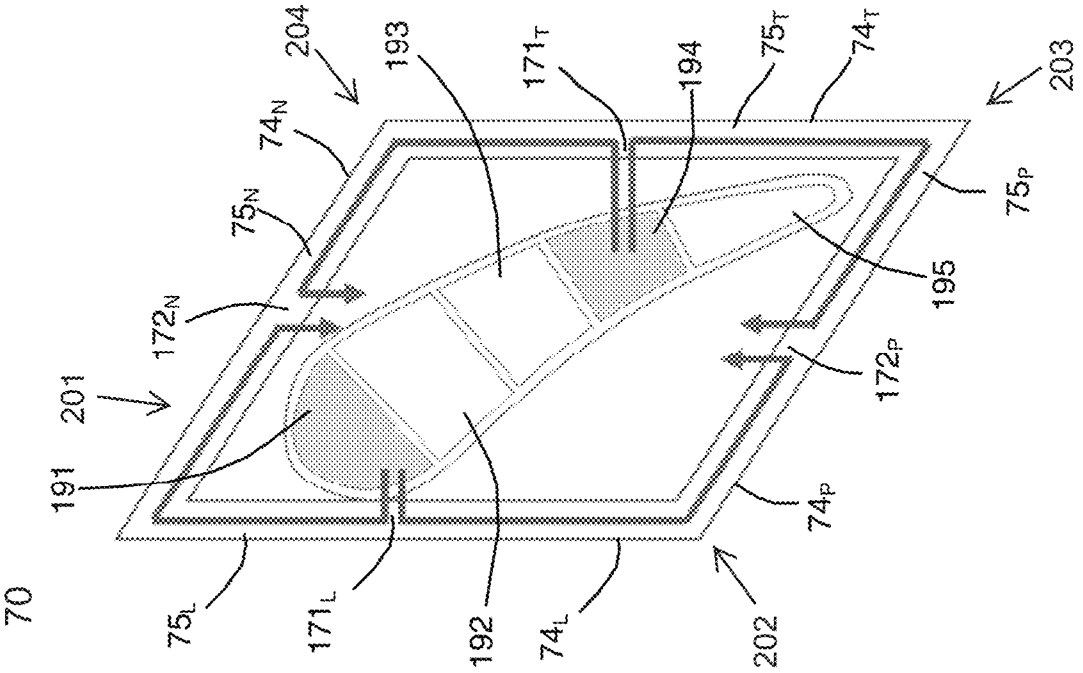

Next, the sixth embodiment of the present application is described below. FIGS. 14A and 14B are respectively a schematic sectional view of a stator vane according to the sixth embodiment. FIGS. 14A and 14B respectively show an embodiment in which the shroud edge surrounds the shroud main body and the shroud edge passage is divided into four sub-passages. In this embodiment, the outer shroud 70 includes two shroud edge passage inlets (a leading-side shroud edge passage inlet $\mathbf{171}_L$ and a trailing-side shroud edge passage inlet $\mathbf{171}_T$), and two shroud edge passage outlets (a pressure-side shroud edge passage outlet $\mathbf{172}_P$ and a suction-side shroud edge passage outlet $\mathbf{172}_N$). The leading-side shroud edge passage inlet $\mathbf{171}_L$ is provided to the leading-side shroud edge $\mathbf{74}_L$. The trailing-side shroud edge passage inlet $\mathbf{171}_T$ is provided to the trailing-side shroud edge $\mathbf{74}_T$. The pressure-side shroud edge passage outlet $\mathbf{172}_P$ is provided to the pressure-side shroud edge $\mathbf{74}_P$. The suction-side shroud edge passage outlet $\mathbf{172}_N$ is provided to the suction-side shroud edge $\mathbf{74}_N$.

In FIG. 14A, the first sub-passage 201 is extended between the leading-side shroud edge passage inlet $\mathbf{171}_L$ and the suction-side shroud edge passage outlet $\mathbf{172}_N$. The second sub-passage 202 is extended between the leading-side shroud edge passage inlet $\mathbf{171}_L$ and the pressure-side shroud edge passage outlet $\mathbf{172}_P$. The third sub-passage 203 is extended between the trailing-side shroud edge passage inlet $\mathbf{171}_T$ and the pressure-side shroud edge passage outlet $\mathbf{172}_P$. The fourth sub-passage 204 is extended between the trailing-side shroud edge passage inlet $171_T$ and the suction-side shroud edge passage outlet $172_N$. For example, each of the first to fourth sub-passages has a cooling air inlet at one end thereof and a cooling air outlet at an opposite end thereof so as to have an airtight passage from the one end thereof through the opposite end thereof.

In this embodiment, the inner shroud 60 includes two shroud edge passage inlets (a leading-side shroud edge passage inlet $\mathbf{181}_L$ and a trailing-side shroud edge passage inlet $\mathbf{181}_T$), and two shroud edge passage outlets (a pressure-side shroud edge passage outlet $\mathbf{182}_P$ and a suction-side shroud edge passage outlet $\mathbf{182}_N$). The leading-side shroud edge passage inlet $\mathbf{181}_L$ is provided to the leading-side shroud edge $\mathbf{64}_L$. The trailing-side shroud edge passage inlet $\mathbf{181}_T$ is provided to the trailing-side shroud edge $\mathbf{64}_T$. The pressure-side shroud edge passage outlet $\mathbf{182}_E$ is provided to the pressure-side shroud edge $\mathbf{64}_P$. The suction-side shroud edge passage outlet $\mathbf{182}_H$ is provided to the suction-side shroud edge $\mathbf{64}_N$.

In FIG. 14B, the first sub-passage 201 is extended between the leading-side shroud edge passage inlet $\mathbf{181}_L$ and the pressure-side shroud edge passage outlet $\mathbf{182}_P$. The second sub-passage 202 is extended between the leading-side shroud edge passage inlet $\mathbf{181}_L$ and the suction-side shroud edge passage outlet $\mathbf{182}_N$. The third sub-passage 203 is extended between the trailing-side shroud edge passage inlet $\mathbf{181}_T$ and the suction-side shroud edge passage outlet $\mathbf{182}_N$. The fourth sub-passage 204 is extended between the trailing-side shroud edge passage inlet $\mathbf{181}_T$ and the pressure-side shroud edge passage outlet $\mathbf{182}_P$. For example, each of the first to fourth sub-passages has a cooling air inlet at one end thereof and a cooling air outlet at an opposite end thereof so as to have an airtight passage from the one end thereof through the opposite end thereof.

As shown by FIG. 14A, the first air channel 191 is communicated with the shroud edge passage inlet $\mathbf{171}_L$ of the outer shroud 70 disposed at the leading-side shroud edge $\mathbf{74}_L$. Also, the fourth air channel 194 is communicated with the shroud edge passage inlet $\mathbf{171}_T$ of the outer shroud 70 disposed at the trailing-side shroud edge $\mathbf{74}_T$.

In this embodiment, for example, part of cooling air which is supplied to the first air channel 191 is jetted from a first inner air channel through the apertures 59 of a first insert toward the inner surface of the leading end part of the airfoil 51, and then is guided to flow in the radially outer direction through the own outer air channel toward the outer shroud 70, then, as shown by FIG. 14A, flows into the leading-side shroud edge passage inlet $\mathbf{171}_L$. The cooling air then flows along the leading-side shroud edge passage $\mathbf{75}_L$. Then, the cooling air flows along the pressure-side shroud edge passage $\mathbf{75}_P$, then flows out from pressure-side shroud edge passage outlet $\mathbf{172}_P$ to the shroud main body 72, for example, into the outer region of the hollow space S of the shroud main body 72. The cooling air also flows along the suction-side shroud edge passage $\mathbf{75}_N$, then flows out from pressure-side shroud edge passage outlet $\mathbf{172}_N$ to the shroud main body 72, for example, into the outer region of the hollow space S of the shroud main body 72. In this embodiment, for example, part of cooling air which is supplied to the fourth air channel 194 is jetted from a fourth inner air channel through the apertures 59 of a fourth insert toward the inner surface of the intermediate part of the airfoil 51, and then is guided to flow in the radially outer direction through the own outer air channel toward the outer shroud 70, then, as shown by FIG. 14A, flows into the trailing-side shroud edge passage inlet $\mathbf{171}_T$. The cooling air then flows along the trailing-side shroud edge passage $\mathbf{75}_T$. Then, the cooling air flows along the pressure-side shroud edge passage $\mathbf{75}_P$, then flows out from pressure-side shroud edge passage outlet $\mathbf{172}_P$ to the shroud main body 72, for example, into the outer region of the hollow space S of the shroud main body 72. The cooling air also flows along the suction-side shroud edge passage $\mathbf{75}_N$, then flows out from pressure-side shroud edge passage outlet $\mathbf{172}_N$ to the shroud main body 72, for example, into the outer region of the hollow space S of the shroud main body 72.

As shown by FIG. 14B, the second air channel 192 is communicated with the shroud edge passage inlet $\mathbf{181}_L$ of the inner shroud 60 disposed at the leading-side shroud edge $\mathbf{64}_L$. The third air channel 193 is communicated with the shroud edge passage inlet $\mathbf{181}_T$ of the inner shroud 60 disposed at the trailing-side shroud edge $\mathbf{64}_T$.

In this embodiment, for example, part of cooling air which is supplied to the second air channel 192 is jetted from a second inner air channel through the apertures 59 of a second insert toward the inner surface of the intermediate part of the airfoil 51, and then is guided to flow in the radially inner direction through the own outer air channel toward the inner shroud 60, then, as shown by FIG. 14B, flows into the leading-side shroud edge passage inlet $\mathbf{181}_L$. The cooling air then flows along the leading-side shroud edge passage $\mathbf{65}_L$. Then, the cooling air flows along the pressure-side shroud edge passage $\mathbf{65}_P$, then flows out from pressure-side shroud edge passage outlet 1822 to the shroud main body 62, for example, into the inner region of the hollow space S of the shroud main body 62. The cooling air also flows along the suction-side shroud edge passage $\mathbf{65}_N$, then flows out from pressure-side shroud edge passage outlet $\mathbf{182}_N$ to the shroud main body 62, for example, into the inner region of the hollow space S of the shroud main body 62. In this embodiment, for example, part of cooling air which is supplied to the third air channel 193 is jetted from a third inner air channel through the apertures 59 of a third insert toward the inner surface of the intermediate part of the airfoil 51, and then is guided to flow in the radially inner direction through the own outer air channel toward the inner shroud 60, then, as shown by FIG. 14B, flows into the trailing-side shroud edge passage inlet $\mathbf{181}_T$. The cooling air then flows along the trailing-side shroud edge passage $\mathbf{65}_T$. Then, the cooling air flows along the pressure-side shroud edge passage $\mathbf{65}_P$, then flows out from pressure-side shroud edge passage outlet $\mathbf{182}_P$ to the shroud main body 62, for example, into the inner region of the hollow space S of the shroud main body 62. The cooling air also flows along the suction-side shroud edge passage $\mathbf{65}_N$, then flows out from pressure-side shroud edge passage outlet $\mathbf{182}_N$ to the shroud main body 62, for example, into the inner region of the hollow space S of the shroud main body 62.

The structure of the stator vane is not limited to this embodiment. As an alternative embodiment, the first air channel 191 may be communicated with the shroud edge passage inlet $\mathbf{181}_L$ of the inner shroud 60 disposed at the leading-side shroud edge $\mathbf{64}_L$. Also, the fourth air channel 194 may be communicated with the shroud edge passage inlet $\mathbf{181}_T$ of the inner shroud 60 disposed at the trailing-side shroud edge $\mathbf{64}_T$. Also, the second air channel 192 may be communicated with the shroud edge passage inlet $\mathbf{171}_L$ of the outer shroud 70 disposed at the leading-side shroud edge $\mathbf{74}_L$. The third air channel 193 is communicated with the shroud edge passage inlet $\mathbf{171}_T$ of the outer shroud 70 disposed at the trailing-side shroud edge $\mathbf{74}_T$.

Figure 15:
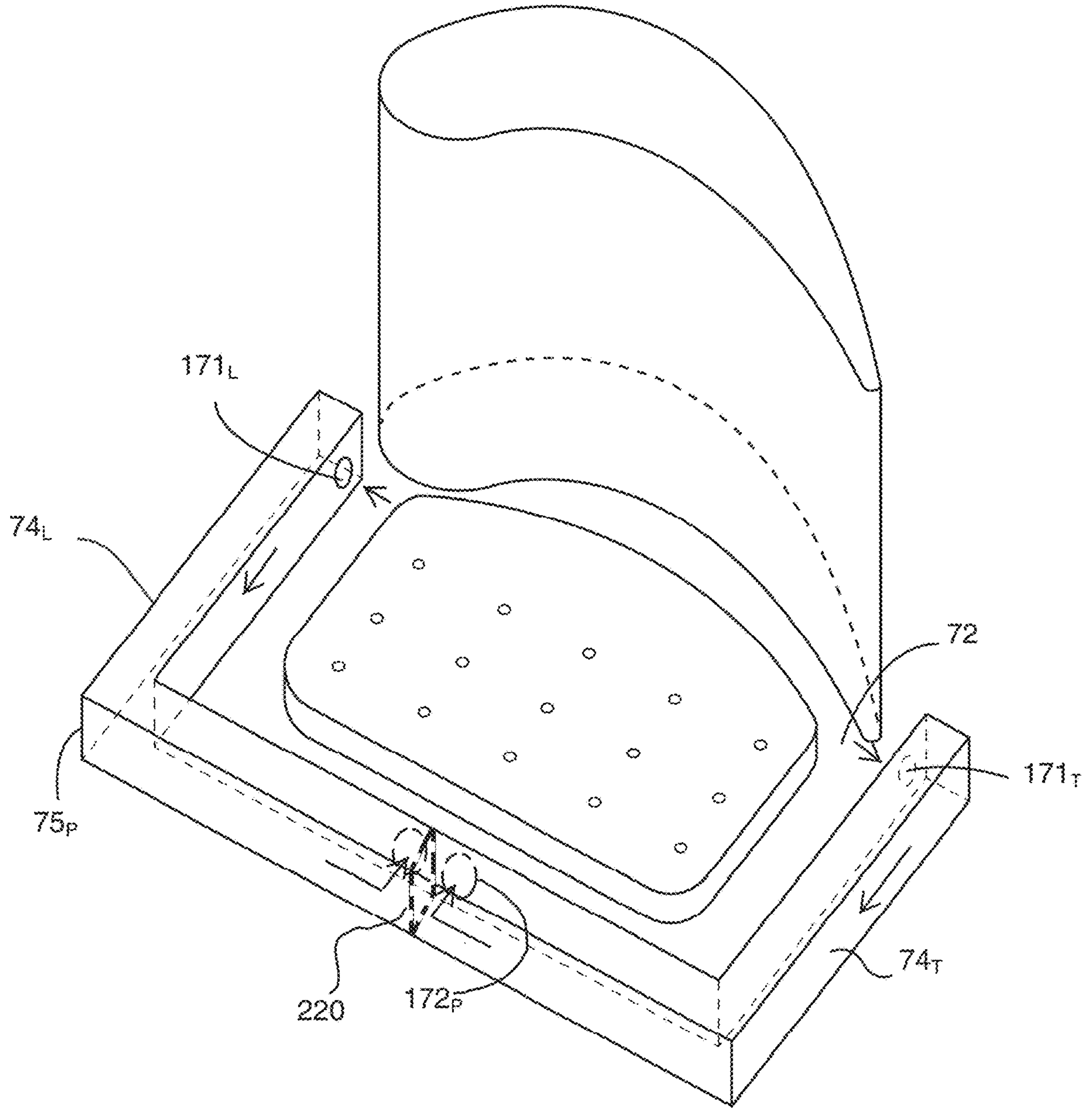
FIG. 15 is a schematic partial view of a stator vane according to the seventh embodiment.

Next, the seventh embodiment of the present application is described below. FIG. 15 is a schematic partial view of a stator vane according to the seventh embodiment. In this embodiment, the pressure-side shroud edge passage outlet $172_P$ includes two outlets (the first outlet located on the leading-side and the second outlet located on the trailing side) adjacent to each other. The pressure-side shroud edge passage 75F is divided in to two passages by a partition wall 220. The partition wall 220 is disposed between the two outlets. In this embodiment, the cooling air flowing from the leading-side shroud edge passage inlet $171_L$ is blocked by the partition wall 220 and flows out from the first outlet. On the other hand, the cooling air flowing from the trailing-side shroud edge passage inlet $171_T$ is blocked by the partition wall 220 and flows out from the second outlet.

By this structure, the air flow coming from the leading-side shroud edge passage inlet $171_L$ can be separated from the air flow coming from the trailing-side shroud edge passage inlet $171_T$. The cooling air coming from the leading-side shroud edge passage inlet $171_L$ has different temperature from that of the air flow coming from the trailing-side shroud edge passage inlet $171_T$. By this structure, it becomes possible to prevent two air flows having different temperatures from mixing each other which facilitates temperature control of the cooling system.

The structure of the stator vane is not limited to this embodiment. The structure with two outlets and the partition wall therebetween may be applied to other shroud edge passage. For example, the structure with two outlets and the partition wall therebetween may be applied to the suction-side shroud edge passage $75_N$ and to the suction-side shroud edge passage outlet $172_P$.

The present disclosure is not limited to the above-described embodiment and can be implemented in various embodiments. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

10 gas turbine
20 turbine
22 turbine casing
24 rotor shaft
26 turbine rotor
Ar Axis
30 combustor
50 stator vane
51 vane body (airfoil)
$\mathbf{51}_P$ partition walls
52 leading edge
53 trailing edge
54 suction-side surface
55 pressure-side surface
56 intake manifold
57 outer air channel
58 air inlet
59 apertures
141, 142, 143 air channel
151, 152, 153 insert
161, 162, 163 inner air channel
191, 192, 193, 194, 195 air channel
154 airfoil cooling structure
164 pin fins
60 inner shroud
70 outer shroud
62, 72 shroud main body
63, 73 impingement plate
64, 74 shroud edge
65, 75 shroud edge passage
S hollow space
171 shroud edge passage inlet
172 shroud edge passage outlet
175 turbulator
76 peripheral wall
78 gas path surface
79 air holes
81 radially inner wall
82 radially outer wall
83 exit conduit
181 shroud edge passage inlet
182 shroud edge passage outlet
201, 202, 203, 204 sub-passages
220 partition wall

What is claimed is:

1. A shroud of a vane of a turbine comprising:
a shroud main body; and
a shroud edge disposed on a circumference of the shroud main body to surround the shroud main body, the shroud edge comprising a shroud edge passage therein, the shroud edge passage is disposed along the circumference of the shroud main body,
wherein the shroud edge comprises a plurality of cooling air inlets configured to introduce a cooling air into the shroud edge passage from outside of the shroud edge, and a plurality of cooling air outlets configured to cause the cooling air to flow out of the shroud edge passage to the outside of the shroud edge,
wherein the shroud edge passage is divided into three or more sub-passages by the plurality of cooling air inlets and the plurality of cooling air outlets, each of the sub-passages is entirely disposed in the shroud edge along the circumference of the shroud main body to surround the shroud main body,
wherein the shroud edge comprises:
a leading-side shroud edge positioned at an upstream end portion of the shroud edge with respect to a flow of hot gas in the turbine,
a trailing-side shroud edge positioned at a downstream end portion of the shroud edge with respect to the flow of hot gas in the turbine,
a suction-side shroud edge positioned on a suction side of the shroud edge with respect to the flow of hot gas in the turbine, and
a pressure-side shroud edge positioned on a pressure side of the shroud edge with respect to the flow of hot gas in the turbine,
wherein one of the three or more sub-passages includes a cooling air inlet thereof located at a longitudinal middle of one of the leading-side shroud edge, the trailing-side shroud edge, the suction-side shroud edge and the pressure-side shroud edge, and includes a cooling air outlet thereof located at a longitudinal middle of another one of the leading-side shroud edge, the trailing-side shroud edge, the suction-side shroud edge and the pressure-side shroud edge,
wherein the shroud edge passage is divided into four sub-passages by the plurality of cooling air inlets and the plurality of cooling air outlets,
wherein the plurality of cooling air inlets include a first cooling air inlet disposed at a middle portion of the leading-side shroud edge and a second cooling air inlet disposed at a middle portion of the trailing-side shroud edge, and the plurality of cooling air outlets include a first cooling air outlet disposed at a middle portion of the suction-side shroud edge and a second cooling air outlet disposed at a middle portion of the pressure-side shroud edge, wherein the sub-passages comprise:

a first sub-passage bordered by the first cooling air inlet and the first cooling air outlet, a second sub-passage bordered by the first cooling air inlet and the second cooling air outlet, a third sub-passage bordered by the second cooling air inlet and the first cooling air outlet, and a fourth sub-passage bordered by the second cooling air inlet and the second cooling air outlet.

2. The shroud of the vane of the turbine according to claim 1, wherein each of the sub-passages has one of the plurality of cooling air inlets at one end thereof and one of the plurality of cooling air outlets at an opposite end thereof so as to have an airtight passage from the one end thereof through the opposite end thereof.

3. The shroud of the vane of the turbine according to claim 1, wherein at least one of the plurality of the cooling air inlets is positioned at a downstream end portion of the shroud edge with respect to a flow of hot gas in the turbine.

4. The shroud of the vane of the turbine according to claim 1, wherein the plurality of the cooling air inlets include a first cooling air inlet disposed to the leading-side shroud edge and a second cooling air inlet disposed to the trailing-side shroud edge.

5. The shroud of the vane of the turbine according to claim 1, wherein the plurality of cooling air outlets are connected to the shroud main body to cause the cooling air to flow out of the shroud edge passage into the shroud main body.

6. The shroud of the vane of the turbine according to claim 5, wherein the shroud main body includes a hollow space inside thereof, and the cooling air is caused to flow out of the shroud edge passage into the hollow space.

7. The shroud of the vane of the turbine according to claim 1, wherein the shroud edge surrounds the shroud main body entirely.

8. The shroud of the vane of the turbine according to claim 1, wherein the suction-side shroud edge comprises a suction-side shroud edge passage therein, and the pressure-side shroud edge comprises a pressure-side shroud edge passage therein, and the suction-side shroud edge passage or the pressure-side shroud edge passage is divided by a partition wall.

9. The shroud of the vane of the turbine according to claim 1, wherein the first cooling air outlet is partitioned by a partition wall into a leading-side first cooling air outlet bordering the first sub-passage and a trailing-side first cooling air outlet bordering the third sub-passage, the second cooling air outlet is partitioned by a partition wall into a leading-side second cooling air outlet bordering the second sub-passage and a trailing-side second cooling air outlet bordering the fourth sub-passage.

10. The shroud of the vane of the turbine according to claim 1, wherein the shroud main body comprises a hollow space inside thereof, the hollow space being connected with the shroud edge passage through the plurality of cooling air outlets to cause the cooling air to flow out of the shroud edge passage through the plurality of cooling air outlets into the hollow space.

11. The shroud of the vane of the turbine according to claim 1, wherein each of the sub-passages has a cooling air inlet at one end thereof and a cooling air outlet at an opposite end thereof so as to have an airtight passage from the one end thereof through the opposite end thereof.

12. A shroud of a vane of a turbine comprising:

a shroud main body; and a shroud edge disposed on a circumference of the shroud main body to surround the shroud main body, the shroud edge comprising a shroud edge passage therein, the shroud edge passage is disposed along the circumference of the shroud main body, wherein the shroud edge comprises a plurality of cooling air inlets configured to introduce a cooling air into the shroud edge passage from outside of the shroud edge, and a plurality of cooling air outlets configured to cause the cooling air to flow out of the shroud edge passage to the outside of the shroud edge, wherein the shroud edge passage is divided into three or more sub-passages by the plurality of cooling air inlets and the plurality of cooling air outlets, each of the sub-passages is entirely disposed in the shroud edge along the circumference of the shroud main body to surround the shroud main body, wherein the shroud edge comprises:

a leading-side shroud edge positioned at an upstream end portion of the shroud edge with respect to a flow of hot gas in the turbine, a trailing-side shroud edge positioned at a downstream end portion of the shroud edge with respect to the flow of hot gas in the turbine, a suction-side shroud edge positioned on a suction side of the shroud edge with respect to the flow of hot gas in the turbine, and a pressure-side shroud edge positioned on a pressure side of the shroud edge with respect to the flow of hot gas in the turbine, wherein one of the three or more sub-passages includes a cooling air inlet thereof located at a longitudinal middle of one of the leading-side shroud edge, the trailing-side shroud edge, the suction-side shroud edge and the pressure-side shroud edge, and includes a cooling air outlet thereof located at a longitudinal middle of another one of the leading-side shroud edge, the trailing-side shroud edge, the suction-side shroud edge and the pressure-side shroud edge, wherein the shroud main body comprises a hollow space inside thereof, the hollow space being connected with the shroud edge passage through the plurality of cooling air outlets to cause the cooling air to flow out of the shroud edge passage through the plurality of cooling air outlets into the hollow space, wherein the shroud main body comprises an impingement plate disposed in the hollow space to divide the hollow space into a radially outer region with respect to a radial direction of the turbine and a radially inner region, the radially outer region of the hollow space being connected with the shroud edge passage through the plurality of cooling air outlets, and the impingement plate including a plurality of air holes therethrough in the radial direction.

* * * * *